United States Patent
Yahata et al.

(10) Patent No.: US 7,706,618 B2
(45) Date of Patent: Apr. 27, 2010

(54) IMAGE CODING APPARATUS, IMAGE CODING METHOD, AND RECORDING MEDIUM, CAPABLE OF CREATING HIGHLY VERSATILE DATA

(75) Inventors: Yoichiro Yahata, Tenri (JP); Kensaku Kagechi, Nara (JP); Hisashi Saiga, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 831 days.

(21) Appl. No.: 11/590,842

(22) Filed: Nov. 1, 2006

(65) Prior Publication Data

US 2007/0098285 A1  May 3, 2007

(30) Foreign Application Priority Data

Nov. 2, 2005  (JP) .............................. 2005-319812

(51) Int. Cl.
  *G06K 9/36* (2006.01)
(52) U.S. Cl. .................. 382/232; 382/233; 382/249
(58) Field of Classification Search .................. 382/232, 382/233, 240; 386/70, 125; 341/67, 59, 341/50; 370/395.71, 413; 375/E7.015, E7.175, 375/240.01
See application file for complete search history.

(56) References Cited

U.S. PATENT DOCUMENTS

| | | | |
|---|---|---|---|
| 5,778,092 A | 7/1998 | MacLeod et al. | |
| 6,373,981 B1 | 4/2002 | de Queiroz et al. | |
| 6,385,343 B1 * | 5/2002 | Kuroda et al. | 382/233 |

FOREIGN PATENT DOCUMENTS

| | | |
|---|---|---|
| JP | 02-123479 A | 5/1990 |
| JP | 02-155087 A | 6/1990 |
| JP | 4-356873 A | 12/1992 |
| JP | 05-014701 A | 1/1993 |
| JP | 05-114045 A | 5/1993 |
| JP | 6-333033 A | 12/1994 |
| JP | 07-212601 A | 8/1995 |
| JP | 7-240845 A | 9/1995 |
| JP | 2000-196895 A | 7/2000 |
| JP | 2004-187000 A | 7/2004 |
| JP | 2004-350182 A | 12/2004 |
| JP | 2005-151097 A | 6/2005 |
| JP | 2005-151382 A | 6/2005 |

* cited by examiner

*Primary Examiner*—Anh Hong Do
(74) *Attorney, Agent, or Firm*—Birch, Stewart, Kolasch & Birch, LLP

(57) ABSTRACT

An input image is subjected to image region determination in a unit of prescribed block. Based on a result of image region determination, two or more pieces of layer data, of which validity or invalidity at the time of reproduction of the image is defined in a unit of prescribed block are generated by using data of the input image. Then, each of the two or more pieces of layer data is subjected to coding processing under a coding condition suitable for each of the generated two or more pieces of layer data, in a unit of block suitable for each of the two or more pieces of layer data.

32 Claims, 13 Drawing Sheets

| COMBINATION NUMBER | RESOLUTION(dpi) | | | BLOCK SIZE (THE NUMBER OF PIXELS IN HORIZONTAL DIRECTION × THE NUMBER OF PIXELS IN VERTICAL DIRECTION) | | |
|---|---|---|---|---|---|---|
| | INPUT IMAGE | FOREGROUND IMAGE | BACKGROUND IMAGE | IMAGE REGION DETERMINATION | FOREGROUND IMAGE | BACKGROUND IMAGE |
| 1 | 600 | 300 | 150 | 32×32 | 16×16 | 8×8 |
| 2 | 600 | 600 | 300 | 16×16 | 16×16 | 8×8 |
| 3 | 600 | 600 | 150 | 32×32 | 32×32 | 8×8 |
| 4 | 300 | 300 | 150 | 16×16 | 16×16 | 8×8 |

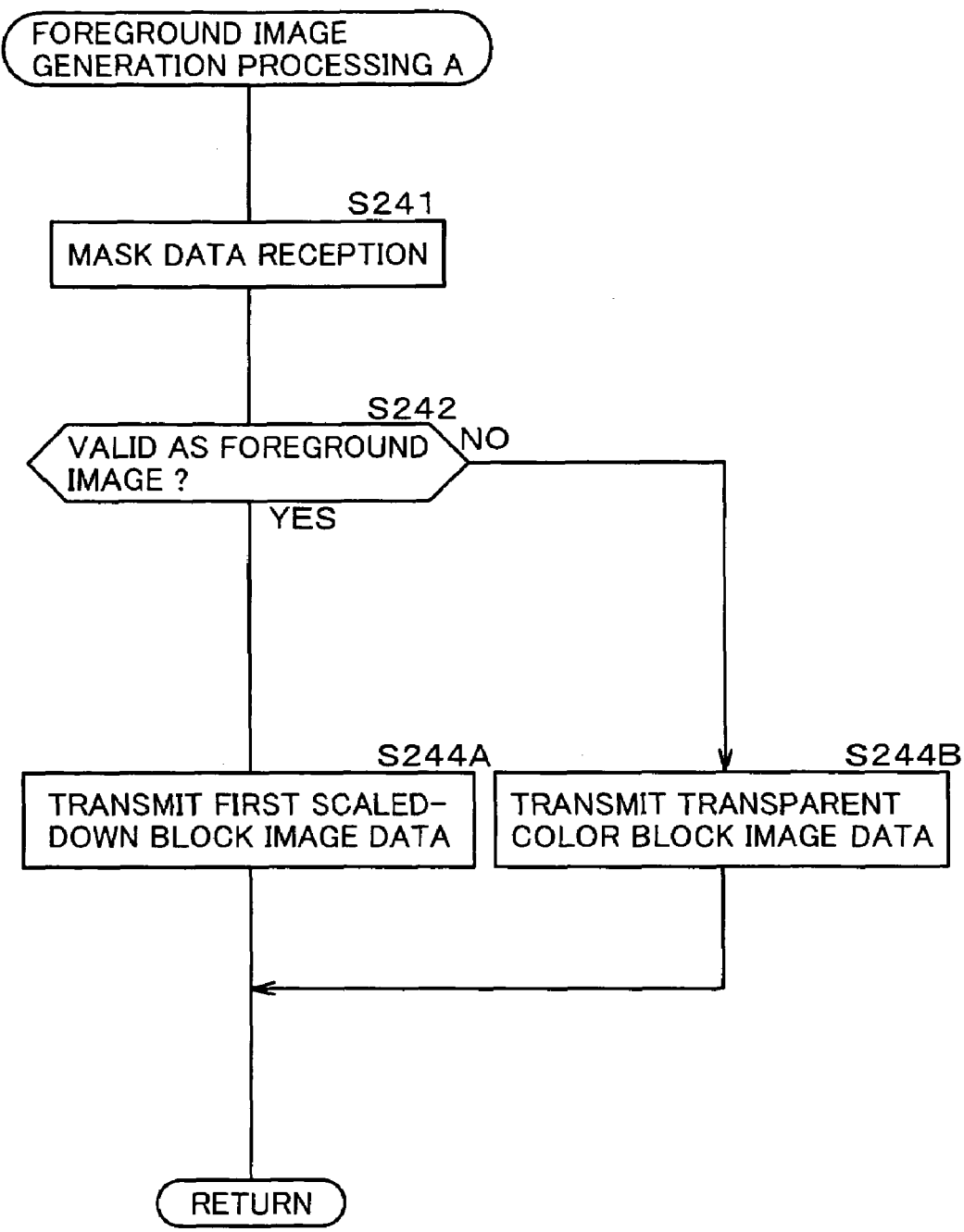

IMAGE CODING APPARATUS, IMAGE CODING METHOD, AND RECORDING MEDIUM, CAPABLE OF CREATING HIGHLY VERSATILE DATA

This nonprovisional application is based on Japanese Patent Application No. 2005-319812 filed with the Japan Patent Office on Nov. 2, 2005, the entire contents of which are hereby incorporated by reference.

FIELD OF THE INVENTION

The present invention relates to an image coding apparatus, an image coding method and a recording medium, and more particularly to an image coding apparatus, an image coding method and a recording medium processing an image for each of a plurality of layers.

DESCRIPTION OF THE BACKGROUND ART

In recent years, everything including paper documents is computerized. Accordingly, in order to store a larger amount of data in an apparatus or a medium for recording electronic data, efficient reduction in a data amount has been demanded.

For example, in recording data of an image where a plurality of different elements such as a character and a photograph are arranged in a recording apparatus or a recording medium, a technique to efficiently reducing a capacity of image data is important. Namely, a coding technique increasing an amount of reduction in data capacity with less image quality deterioration is important. In the following, a region within an image where elements such as a character and a photograph are displayed is also referred to as an image region. Here, a recording apparatus is implemented, for example, by a hard disk included in a personal computer, a copying machine or a multifunction machine. In addition, a recording medium is implemented, for example, by a CD-R.

Japanese Patent Laying-Open No. 07-212601 discloses a technique to perform image region separation in a unit of matrix (block) used in coding processing and to apply coding using the matrix to a result after image region separation (hereinafter, also referred to as conventional technique A).

In addition, Japanese Patent Laying-Open No. 07-212601 discloses a technique for efficiently separating a photograph portion in a unit of matrix (hereinafter, also referred to as conventional technique A). In conventional technique A, the photograph portion is coded (for example, JPEG (Joint Photographic Coding Experts Group)) in a unit of matrix and a character portion (a portion other than the photograph) is binarized, thus performing lossless coding (for example, run-length coding). In this manner, image data including a plurality of different image regions can efficiently be coded.

Japanese Patent Laying-Open No. 2004-187000 discloses a technique based on MRC (Mixed Raster Content) defined in ITU-T recommendation T.44 (hereinafter, also referred to as conventional technique B).

In MRC, image data including a plurality of different image regions such as a character, a line and a photograph is separated into three planes in total, i.e., a foreground plane, a background plane and a mask plane. Here, the mask plane refers to a plane indicating which of the foreground plane and the background plane is to be selected. MRC defines a scheme for individually coding the three planes.

In general, in an image coding apparatus employing MRC, the mask plane representing information for selecting between the foreground plane representing a character and a line and the background plane representing a photograph or the like is constituted of pixels.

In the image coding apparatus employing MRC, the mask plane is responsible for holding information on shape of a character and a line at high resolution for lossless coding at high resolution. In many cases, the foreground plane holding information on color of a character and a line and the background plane including a photograph or the like where deterioration due to lower resolution is not noticeable are subjected to lossy coding at resolution lower than the mask plane.

In addition, Japanese Patent Laying-Open No. 2004-187000 discloses a technique to lower color haze or the like that occurs when resolution of the foreground plane and the background plane is lowered, by devising a method of calculating a pixel value of a don't care pixel in the background image region in the foreground plane and a don't care pixel in the foreground image region in the background plane. Here, the don't care pixel refers to a pixel not referred to in reproduction of an image by combining data.

Meanwhile, in electronically recording the image data, selection of a data format (data form) is important. For example, if image data is coded, stored and decoded in one apparatus, an original data format may be employed. On the other hand, if coded and recorded data is transmitted between apparatuses, it is preferable to comply with a data format widely used in general.

For example, the data format complying with JPEG scheme is widely used in a personal computer, a digital still camera and the like. In addition, PDF (Portable Document Format) developed by Adobe (trademark) is also one of the widely used image data formats.

In conventional technique A, a character is binarized for lossless coding. Therefore, in conventional technique A, lossless coding of a colored character or a colored line present in the photograph image region is difficult, and a coding condition for a photograph image region is applied.

In other words, in conventional technique A, coding causes apparent deterioration in the shape of a character or a line, depending on a condition such as color. In addition, conventional technique A does not employ the widely used data format and suffers poor versatility.

In addition, in conventional technique B, the mask plane is responsible for holding the information on shape of a character and a line. Therefore, if the mask plane is coded, high resolution and reversibility are required, which leads to necessity for a large data capacity for holding the mask plane.

Moreover, though conventional technique B achieves lowering in color haze originating from the don't care pixel, it is difficult to completely avoid color haze.

SUMMARY OF THE INVENTION

An object of the present invention is to provide an image coding apparatus, an image coding method and a recording medium, capable of creating highly versatile data of which data capacity is significantly reduced while minimizing deterioration in image quality in coding processing.

An image coding apparatus according to one aspect of the present invention includes: a block image region determination unit performing image region determination of an input image in a unit of prescribed block; a layer data generation unit generating two or more pieces of layer data, of which validity or invalidity in image reproduction is defined in the unit of prescribed block, by using data of the input image, based on a result of image region determination in the block image region determination unit; and a coding unit subjecting each of the two or more pieces of layer data to coding processing under a coding condition suitable for each of the two or more pieces of layer data generated by the layer data generation unit, in a unit of block suitable for each of the two or more pieces of layer data.

Preferably, the coding unit includes two or more pieces of data coding units subjecting the two or more pieces of layer data to coding processing respectively, under coding conditions suitable for the two or more pieces of layer data respectively, in units of block suitable for the two or more pieces of data respectively.

Preferably, at least one piece of layer data out of the two or more pieces of layer data is image data, the layer data generation unit sets a plurality of pixel values constituting each block image within one or more block defined as invalid in image reproduction, in an image based on the layer data which is the image data, and the plurality of pixel values set by the layer data generation unit are values smaller in coded data capacity obtained as a result of the coding processing of the layer data of the image data by the coding unit, than a value set by using data of the input image.

According to the present invention, the image can be coded such that a reduction amount of data capacity is greater and influence of color haze originating from the set pixel value is not shown in the reproduced image.

Preferably, at least one piece of layer data out of the two or more pieces of layer data is image data, the image coding apparatus further includes a resolution conversion unit generating a converted image obtained by converting resolution of the input image, and the layer data generation unit sets data of one or more block image within the converted image, corresponding to one or more block defined as valid in image reproduction respectively, in an image based on the layer data which is the image data.

According to the present invention, the image can be coded such that a reduction amount of data capacity is greater.

Preferably, the image coding apparatus further includes a pixel image region determination unit performing image region determination of the input image in a unit of pixel, and the block image region determination unit performs image region determination in a unit of block based on a result of image region determination in a unit of pixel performed by the pixel image region determination unit.

According to the present invention, image region determination in a unit of block can more accurately be performed.

Preferably, the block image region determination unit determines whether a block to be determined includes a character or a line, at least one piece of layer data out of the two or more pieces of layer data generated by the layer data generation unit is image data, and an image based on the layer data which is the image data is an image in which a character or a line is displayed.

According to the present invention, coding is performed by setting an appropriate parameter for the block including the character or the line having relatively large high-frequency component, so that the character or the line can be held and coded with relatively high definition.

Preferably, the block image region determination unit determines whether a block to be determined includes at least one of a character, a line and an edge portion, at least one piece of layer data out of the two or more pieces of layer data generated by the layer data generation unit is image data, and an image based on the layer data which is the image data is an image in which at least one of a character, a line and an edge portion is displayed.

According to the present invention, as image region determination is performed in a unit of block, the layer data can be generated with attention being paid to the edge. In addition, coding is performed by setting an appropriate parameter for the block including the character or the line or the edge having relatively large high-frequency component and, so that the character or the line or the edge can be held and coded with relatively high definition.

Preferably, at least one piece of layer data out of the two or more pieces of layer data is image data, and at least one piece of layer data out of the layer data other than the image data, out of the two or more pieces of layer data, is mask layer data constituted of a plurality of pieces of mask data each indicating validity or invalidity in a unit of prescribed block in image reproduction of the layer data which is the image data.

According to the present invention, the capacity of the mask layer data constituted of the plurality of pieces of mask data can be reduced as compared with the case where the mask data is generated in a unit of pixel.

Preferably, the image coding apparatus further includes a lossless coding unit subjecting the mask layer data to lossless coding.

According to the present invention, the capacity of the mask layer data can further be reduced.

Preferably, the image coding apparatus further includes a format unit generating associated data obtained by associating a plurality of pieces of data, and the format unit associates the two or more pieces of layer data that have been subjected to the coding processing with the mask layer data that has been subjected to the lossless coding.

According to the present invention, expression using a highly versatile data format can be achieved.

Preferably, at least two pieces of layer data out of the two or more pieces of layer data are image data, and the layer data generation unit sets a plurality of pixel values constituting each block image within one or more block defined as invalid in image reproduction, in an image based on the layer data which is the image data, to a transparent color value indicating whether a transparent color is shown.

According to the present invention, the image can be reproduced by superimposing a plurality of pieces of layer data, without independently holding the mask layer data.

Preferably, the layer data generation unit sets a plurality of pixel values constituting each block image within one or more block defined as invalid in image reproduction, in an image based on at least one piece of layer data for which the transparent color value has not been set out of at least two pieces of layer data that are the image data, to a value identical to the transparent color value.

According to the present invention, if data in a lower layer is used for a transparent color portion, an image can more accurately be reproduced.

Preferably, the image coding apparatus further includes a format unit generating associated data obtained by associating a plurality of pieces of data, the format unit associates the two or more pieces of layer data that have been subjected to the coding processing with each other, and at least one piece of layer data out of the two or more pieces of layer data includes data set to the transparent color value.

Preferably, the coding processing is lossy coding processing.

Preferably, the lossy coding processing is coding processing complying with JPEG scheme.

Preferably, the prescribed block has the equal number of pixels in horizontal direction and in vertical direction, and the number of pixels is set to a value obtained by multiplying 8 by a natural number.

Preferably, at least one piece of layer data out of the two or more pieces of layer data is image data, the image coding apparatus further includes a resolution conversion unit generating a converted image obtained by converting resolution of the input image, and the layer data generation unit sets data of one or more block image within the converted image, corresponding to one or more block defined as valid in image reproduction respectively, in an image based on the layer data which is the image data.

Preferably, the image coding apparatus further includes a pixel image region determination unit performing image region determination of the input image in a unit of pixel, and the block image region determination unit performs image region determination in a unit of block based on a result of image region determination in a unit of pixel performed by the pixel image region determination unit.

Preferably, the block image region determination unit determines whether a block to be determined includes a character or a line, at least one piece of layer data out of the two or more pieces of layer data generated by the layer data generation unit is image data, and an image based on the layer data which is the image data is an image in which a character or a line is displayed.

Preferably, the block image region determination unit determines whether a block to be determined includes at least one of a character, a line and an edge portion, at least one piece of layer data out of the two or more pieces of layer data generated by the layer data generation unit is image data, and an image based on the layer data which is the image data is an image in which at least one of a character, a line and an edge portion is displayed.

Preferably, at least one piece of layer data out of the two or more pieces of layer data is image data, and at least one piece of layer data out of the layer data other than the image data, out of the two or more pieces of layer data, is mask layer data constituted of a plurality of pieces of mask data each indicating validity or invalidity in a unit of prescribed block in image reproduction of the layer data which is the image data.

Preferably, at least two pieces of layer data out of the two or more pieces of layer data are image data, and the layer data generation unit sets a plurality of pixel values constituting each block image within one or more block defined as invalid in image reproduction, in an image based on the layer data which is the image data, to a transparent color value indicating whether a transparent color is shown.

Preferably, at least one piece of layer data out of the two or more pieces of layer data is image data, the image coding apparatus further includes a resolution conversion unit generating a converted image obtained by converting resolution of the input image, and the layer data generation unit sets data of one or more block image within the converted image, corresponding to one or more block defined as valid in image reproduction respectively, in an image based on the layer data which is the image data.

Preferably, the image coding apparatus further includes a pixel image region determination unit performing image region determination of the input image in a unit of pixel, and the block image region determination unit performs image region determination in a unit of block based on a result of image region determination in a unit of pixel performed by the pixel image region determination unit.

Preferably, the block image region determination unit determines whether a block to be determined includes a character or a line, at least one piece of layer data out of the two or more pieces of layer data generated by the layer data generation unit is image data, and an image based on the layer data which is the image data is an image in which a character or a line is displayed.

Preferably, the block image region determination unit determines whether a block to be determined includes at least one of a character, a line and an edge portion, at least one piece of layer data out of the two or more pieces of layer data generated by the layer data generation unit is image data, and an image based on the layer data which is the image data is an image in which at least one of a character, a line and an edge portion is displayed.

Preferably, at least one piece of layer data out of the two or more pieces of layer data is image data, and at least one piece of layer data out of the layer data other than the image data, out of the two or more pieces of layer data, is mask layer data constituted of a plurality of pieces of mask data each indicating validity or invalidity in a unit of prescribed block in image reproduction of the layer data which is the image data.

Preferably, at least two pieces of layer data out of the two or more pieces of layer data are image data, the layer data generation unit sets a plurality of pixel values constituting each block image within one or more block defined as invalid in image reproduction, in an image based on the layer data which is the image data, to a transparent color value indicating whether a transparent color is shown.

According to another aspect of the present invention, a method of coding an image, executed in an image coding apparatus coding an image, includes the steps of: performing image region determination of an input image in a unit of prescribed block; generating two or more pieces of layer data, of which validity or invalidity in image reproduction is defined in the unit of prescribed block, by using data of the input image, based on a result of image region determination in the step of performing image region determination; and subjecting each of the two or more pieces of layer data to coding processing under a coding condition suitable for each of the two or more pieces of layer data generated in the step of generating two or more pieces of layer data, in a unit of block suitable for each of the two or more pieces of layer data.

Preferably, the coding processing is lossy coding processing.

According to yet another aspect of the present invention, a computer readable recording medium recording an image coding program executed in a computer, causes a computer to execute the steps of: performing image region determination of an input image in a unit of prescribed block; generating two or more pieces of layer data, of which validity or invalidity in image reproduction is defined in the unit of prescribed block, by using data of the input image, based on a result of image region determination in the step of performing image region determination; and subjecting each of the two or more pieces of layer data to coding processing under a coding condition suitable for each of the two or more pieces of layer data generated in the step of generating two or more pieces of layer data, in a unit of block suitable for each of the two or more pieces of layer data.

Preferably, the coding processing is lossy coding processing.

Therefore, the present invention achieves an effect to significantly reduce a data capacity while minimizing deterioration in image quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates a data table.

FIG. 13 is a flowchart of foreground image generation processing A.

DESCRIPTION OF THE PREFERRED EMBODIMENTS

Figure 1:
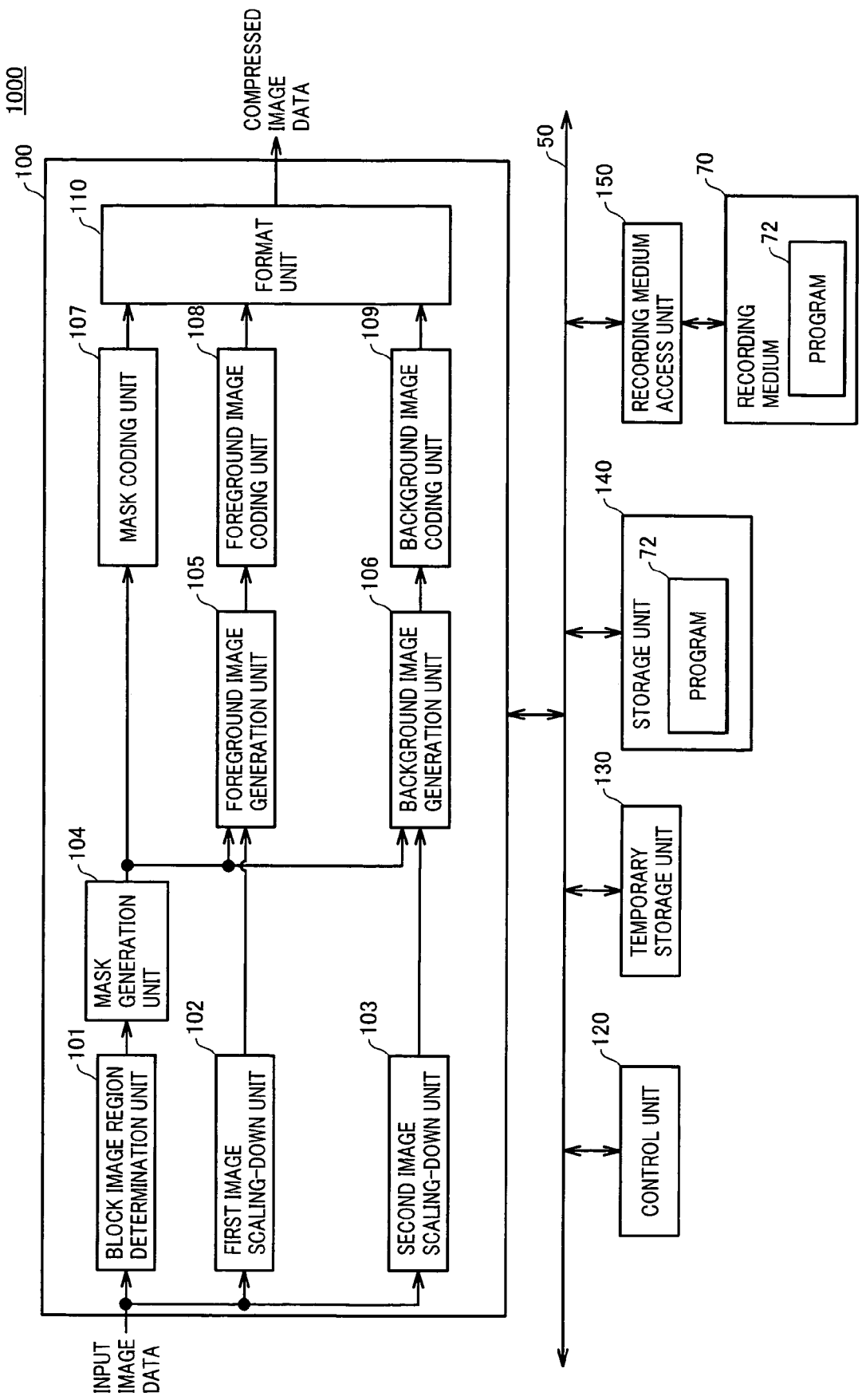
FIG. 1 is a block diagram showing a configuration of an image coding apparatus in a first embodiment.

An embodiment of the present invention will be described hereinafter with reference to the drawings. In the description below, the same elements have the same reference characters allotted. Their label and function are also identical. Therefore, detailed description thereof will not be repeated.

First Embodiment

FIG. 1 is a block diagram showing a configuration of an image coding apparatus 1000 in a first embodiment. Referring to FIG. 1, image coding apparatus 1000 includes an image processing unit 100, a data bus 50, a control unit 120, a temporary storage unit 130, a storage unit 140, a recording medium access unit 150, and a recording medium 70.

Image processing unit 100, control unit 120, temporary storage unit 130, storage unit 140, and recording medium access unit 150 are connected to data bus 50.

Storage unit 140 stores an image coding program 72 for causing image processing unit 100 and control unit 120 to perform processing described later, input image data, other various programs and data, and the like. Storage unit 140 is accessed by image processing unit 100 and control unit 120.

Storage unit 140 is implemented by a hard disk capable of storing a large capacity of data. It is noted that storage unit 140 is not limited to the hard disk, and may be implemented by a medium capable of holding data in a non-volatile manner without power being fed (for example, flash memory).

Though will be described later in detail, image processing unit 100 performs image processing which will be described later, in accordance with image coding program 72 stored in storage unit 140.

Control unit 120 attains a function to perform various types of processing, operational processing and the like for each unit in image coding apparatus 1000, in accordance with image coding program 72 stored in storage unit 140. In addition, control unit 120 attains a function to monitor the processing performed in image processing unit 100.

Control unit 120 may be implemented by any of a microprocessor, an FPGA (Field Programmable Gate Array) representing an LSI (Large Scale Integration) that can be programmed, an ASIC (Application Specific Integrated Circuit) representing an integrated circuit designed and manufactured for a specific application, and other circuits attaining an operational function.

Temporary storage unit 130 attains a function to temporarily store data. Temporary storage unit 130 is accessed by image processing unit 100 and control unit 120, and operates as a work memory. Temporary storage unit 130 may be implemented by any of an RAM (Random Access Memory), an SRAM (Static Random Access Memory), a DRAM (Dynamic Random Access Memory), an SDRAM (Synchronous DRAM), a DDR-SDRAM (Double Data Rate SDRAM), an RDRAM (Rambus Dynamic Random Access Memory), a Direct-RDRAM (Direct Rambus Dynamic Random Access Memory), and other circuits configured to be able to store and hold data in a volatile manner.

Recording medium 70 records image coding program 72 described previously.

Recording medium access unit 150 attains a function to read image coding program 72 from recording medium 70 that records image coding program 72. Image coding program 72 stored in recording medium 70 is read from recording medium access unit 150 and stored in storage unit 140 through install processing by control unit 120.

A program for the install processing is stored in advance in storage unit 140, and the install processing is performed by control unit 120 based on the program for the install processing.

It is noted that storage unit 140 does not have to store image coding program 72. In such a case, control unit 120 reads image coding program 72 stored in recording medium 70 through recording medium access unit 150, and performs prescribed processing based on image coding program 72.

Recording medium 70 is a medium detachable from image coding apparatus 1000. Namely, image coding program 72 recorded in recording medium 70 is recorded in a medium or the like and distributed as a program product. In addition, recording medium 70 is also distributed as a program product.

Recording medium 70 may be implemented by any of a DVD-ROM (Digital Versatile Disk Read Only Memory), a DVD-R (Digital Versatile Disk Recordable), a DVD-RAM (Digital Versatile Disk Random Access Memory), a DVD+RW (Digital Versatile Disk Re-Writable), a DVD-RW, a CD-ROM (Compact Disk Read Only Memory), an MO (Magneto Optical Disk), an MD (Mini Disc) (trademark), a floppy (trademark) disc, a detachable hard disk, a CF (Compact Flash) card, an SM (Smart Media (trademark)), an MMC (Multi Media Card), an SD (Secure Digital) memory card, a memory stick (trademark), an xD picture card and a USB memory, a cassette tape, a magnetic tape, an IC card (including a memory card), an optical card, a mask ROM, an EPROM, an EEPROM, a flash ROM, and other non-volatile memories.

Image processing unit 100 includes a block image region determination unit 101, a first image scaling-down unit 102, a second image scaling-down unit 103, a mask generation unit 104, a foreground image generation unit 105, and a background image generation unit 106.

Data of an input image (hereinafter, also referred to as input image data) is input to block image region determination unit 101. The input image is, for example, an image read by using a not-shown image scanner or the like. The input image data is digital image data complying with color space such as RGB. The input image data is stored in storage unit 140.

Though will be described in detail later, block image region determination unit 101 determines a type of the image region of the input image in a unit of prescribed block. Here, the unit of prescribed block should be set by a system designer in advance, based on resolution of each of the input image, a foreground image and a background image, as well as on a unit for coding processing for each of a foreground image coding unit 108 and a background image coding unit 109. Alternatively, the unit of prescribed block may automatically be selected from among block sizes set in advance in accordance with a processing condition. Specific examples of the block size will be described later.

Block image region determination unit 101 is connected to mask generation unit 104. Block image region determination unit 101 outputs a result of determination of the type of the image region to mask generation unit 104. It is noted that block image region determination unit 101 is implemented, for example, by a dedicated LSI.

Input image data is input to first image scaling-down unit 102. First image scaling-down unit 102 scales down the input image by lowering the resolution of the input image. First image scaling-down unit 102 is connected to foreground image generation unit 105. First image scaling-down unit 102 outputs data of the scaled-down input image (hereinafter, also referred to as the first scaled-down image) to foreground image generation unit 105. The first scaled-down image is an image of which image region such as a character, a line or the like is subjected to processing described later. It is noted that first image scaling-down unit 102 is implemented, for example, by a dedicated LSI.

The input image data is input to second image scaling-down unit 103. Second image scaling-down unit 103 scales down the input image by lowering the resolution of the input image. Second image scaling-down unit 103 is connected to background image generation unit 106. Second image scaling-down unit 103 outputs data of the scaled-down input image (hereinafter, also referred to as the second scaled-down image) to background image generation unit 106. The second scaled-down image is an image of which image region such as a photograph or the like is subjected to processing described later. It is noted that second image scaling-down unit 103 is implemented, for example, by a dedicated LSI.

Here, the resolution (size) of the first scaled-down image and the second scaled-down image may be determined depending on image quality or data capacity of the coded image to be achieved.

For example, the resolutions (size) of the first scaled-down image in vertical and horizontal directions may be set to resolutions (size) at a value obtained by dividing the resolution (size) of the input image in vertical and horizontal directions by a value of $2^M$ and a value of $2^{M'}$ respectively. Here, preferably, M and M' are set to an integer not smaller than 0 and relation of M=M' is satisfied. In addition, the resolutions (size) of the second scaled-down image in vertical and horizontal directions may be set to resolutions (size) at a value obtained by dividing the resolution (size) of the input image in vertical and horizontal directions by a value of $2^N$ and a value of $2^{N'}$ respectively. Here, preferably, N and N' are set to an integer not smaller than 0 and relation of N=N' is satisfied.

Moreover, the resolution of the second scaled-down image, of which image region such as a photograph or the like is subjected to processing described later, is preferably lower than that of the first scaled-down image, of which image region such as a character, a line or the like is subjected to processing described later (M<N and M'<N'). This is because deterioration in image quality of the photograph or a background color is generally not noticeable even if resolution of the photograph or the background color is lower than that of the character or the line. Detailed description and specific examples of combination of resolution will be described later.

An already-existing interpolation method generally used for converting the resolution of an image, such as Nearest Neighbor method, Bilinear method, Bicubic method, and the like, is used for processing for scaling down the image in first image scaling-down unit 102 and second image scaling-down unit 103.

Mask generation unit 104 is connected to block image region determination unit 101. Mask generation unit 104 generates a mask (mask data) based on the result of image region type determination made by block image region determination unit 101. In the following, data constituted of a plurality of pieces of mask data is also referred to as mask layer data.

Mask data is information indicating whether a block image to be processed is valid or invalid as the foreground image at the time of image reproduction. Here, the block image refers to an image in a unit of block. In addition, "valid" indicates that a lower layer (the background layer in the present embodiment) is overwritten at the time of image reproduction, and "invalid" refers to use of data of the lower layer as it is (the background layer in the present embodiment) at the time of image reproduction.

In the present embodiment, the image or the data is processed in a three-layered structure. The first layer is the mask layer. In the mask layer, the mask layer data and mask coded data which will be described later are processed. The second layer is the foreground layer. In the foreground layer, the foreground image is processed. The third layer is the background layer. In the background layer, the background image is processed.

Image processing unit 100 further includes a mask coding unit 107, foreground image coding unit 108, background image coding unit 109, and a format unit 110.

Mask generation unit 104 is connected to mask coding unit 107. Mask generation unit 104 outputs the generated mask to mask coding unit 107.

In addition, mask generation unit 104 is connected to foreground image generation unit 105. Mask generation unit 104 outputs the generated mask data to foreground image generation unit 105. Moreover, mask generation unit 104 is connected to background image generation unit 106. Mask generation unit 104 outputs the generated mask data to background image generation unit 106. It is noted that mask generation unit 104 is implemented, for example, by a dedicated LSI.

Foreground image generation unit 105 is connected to mask generation unit 104 and first image scaling-down unit 102. Foreground image generation unit 105 uses data of the first scaled-down image scaled down in first image scaling-down unit 102 so as to generate the foreground image (foreground layer data), based on the mask layer data constituted of a plurality of pieces of mask data generated in mask generation unit 104. In addition, foreground image generation unit 105 is connected to foreground image coding unit 108. Foreground image generation unit 105 outputs data of the generated foreground image to foreground image coding unit 108. It is noted that foreground image generation unit 105 is implemented, for example, by a dedicated LSI.

Background image generation unit 106 is connected to mask generation unit 104 and second image scaling-down unit 103. Background image generation unit 106 uses data of the second scaled-down image scaled down in second image scaling-down unit 103 so as to generate the background image (background layer data), based on the mask layer data constituted of a plurality of pieces of mask data generated in mask generation unit 104. In addition, background image generation unit 106 is connected to background image coding unit 109. Background image generation unit 106 outputs data of the generated background image to background image coding unit 109. It is noted that background image generation unit 106 is implemented, for example, by a dedicated LSI.

Mask coding unit 107 is connected to mask generation unit 104. Mask coding unit 107 subjects the mask layer data constituted of a plurality of pieces of mask data generated in mask generation unit 104 to lossless coding. As described previously, the mask data is data indicating whether or not a corresponding block image is valid as the foreground image.

In lossless coding, if information for selection in a unit of each pixel (or each block) is expressed in a binary value (if binary image data is used), a coding scheme suitable for lossless coding of a binary image is employed. The coding scheme may be any of MR (Modified Read), MMR (Modified Modified Read), JBIG (Joint Bi-level Image Coding Expert Group), and the like.

Mask coding unit 107 is connected to format unit 110. Mask coding unit 107 outputs the coded mask data to format unit 110. It is noted that mask coding unit 107 is implemented, for example, by a dedicated LSI.

Foreground image coding unit 108 is connected to foreground image generation unit 105. Foreground image coding unit 108 subjects the foreground image generated by foreground image generation unit 105 to lossy coding. The JPEG scheme suitable for coding a multilevel image is used as a coding scheme for lossy coding. It is noted that the coding scheme for lossy coding is not limited to the JPEG scheme, and other coding scheme may be employed.

In addition, foreground image coding unit 108 is connected to format unit 110. Foreground image coding unit 108 outputs data of the coded foreground image to format unit 110. It is noted that foreground image coding unit 108 is implemented, for example, by a dedicated LSI.

Background image coding unit 109 is connected to background image generation unit 106. Background image coding unit 109 subjects the background image generated by background image generation unit 106 to lossy coding. The JPEG scheme suitable for coding a multilevel image is used as a coding scheme for lossy coding. It is noted that the coding scheme for lossy coding is not limited to the JPEG scheme, and other coding scheme may be employed.

In addition, background image coding unit 109 is connected to format unit 110. Background image coding unit 109 outputs data of the coded background image to format unit 110. It is noted that background image coding unit 109 is implemented, for example, by a dedicated LSI.

Format unit 110 is connected to mask coding unit 107, foreground image coding unit 108 and background image coding unit 109. Format unit 110 creates data obtained by associating mask coded data, foreground coded data and background coded data generated in mask coding unit 107, foreground image coding unit 108 and background image coding unit 109 respectively with each other such that these data are handled in an integrated manner (hereinafter, also referred to as associated data).

Format unit 110 creates, for example, one piece of versatile electronic data (hereinafter, also referred to as versatile integrated data), by integrating the mask coded data, the foreground image coded data which will be described later, the background image coded data which will be described later and associated data into one piece of coded image data. It is noted that the versatile integrated data corresponds to compressed image data in FIG. 1. A format of the versatile integrated data generated by format unit 110 is, for example, a data format complying with PDF of Adobe (trademark).

Format unit 110 causes temporary storage unit 130 or storage unit 140 to store the versatile integrated data through data bus 50. Alternatively, format unit 110 may output the versatile integrated data to external equipment through a communication path such as LAN (Local Area Network).

In the description above, though first image scaling-down unit 102 and second image scaling-down unit 103 have been described as components different from each other, first image scaling-down unit 102 and second image scaling-down unit 103 may be implemented as one image scaling-down unit. In this case, the image scaling-down unit should change a parameter for resolution conversion and perform the processing using the function of first image scaling-down unit 102 and second image scaling-down unit 103 as appropriate.

In addition, in the description above, foreground image coding unit 108 and background image coding unit 109 have been described as components different from each other. If both of foreground image coding unit 108 and background image coding unit 109 employ the JPEG scheme, however, foreground image coding unit 108 and background image coding unit 109 may be implemented as one JPEG coding LSI.

In addition, the processing performed by each of block image region determination unit 101, first image scaling-down unit 102, second image scaling-down unit 103, mask generation unit 104, foreground image generation unit 105, background image generation unit 106, mask coding unit 107, foreground image coding unit 108, background image coding unit 109, and format unit 110 described previously may be executed by the microprocessor of a common computer such as a personal computer or control unit 120, instead of the dedicated LSI. Here, for example, the image coding processing which will be described later may be described as a program to be executed by a computer or control unit 120. The program is image coding program 72 and distributed in a manner recorded in recording medium 70.

If the image coding processing which will be described later is executed by the computer, image coding program 72 is recorded in recording medium 70, read into the storage unit included in the computer by the recording medium access unit included in the computer, and executed by a CPU (Central Processing Unit).

If the image coding processing which will be described later is executed by control unit 120, image coding program 72 is recorded in recording medium 70 and executed by control unit 120.

Alternatively, image coding program 72 may be downloaded from another apparatus through a network such as the Internet.

Alternatively, a plurality of dedicated LSIs described previously and the microprocessor of the computer included in image processing unit 100 may be combined. Alternatively, a part or all of the plurality of dedicated LSIs described previously may be implemented as one dedicated LSI.

Specific processing in image coding apparatus 1000 in the first embodiment will now be described.

Figure 2:
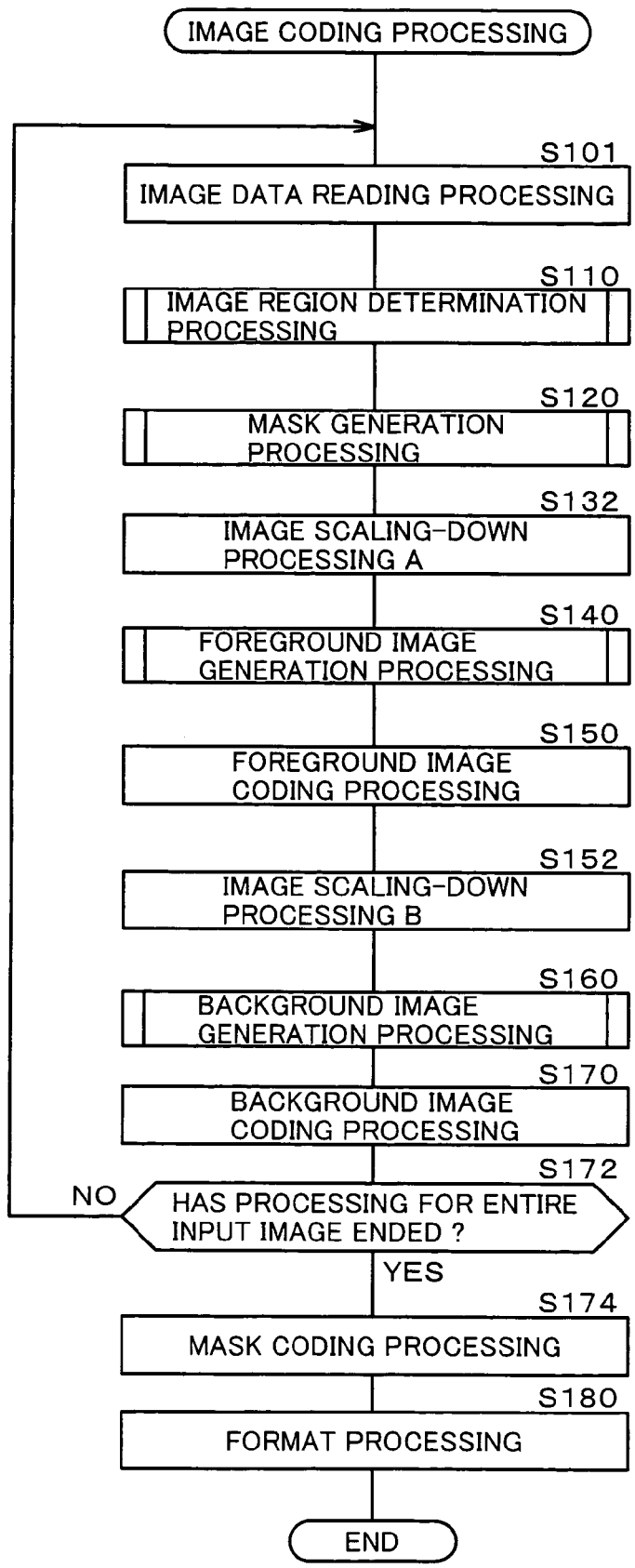
FIG. 2 is a flowchart of image coding processing executed in the image coding apparatus in the first embodiment.

FIG. 2 shows a flowchart of image coding processing executed in image coding apparatus 1000 in the first embodiment. Referring to FIG. 2, in step S101, the image data reading processing is performed. In the image data reading processing, image processing unit 100 reads the input image data stored in storage unit 140 in a unit of prescribed block.

Figure 3:
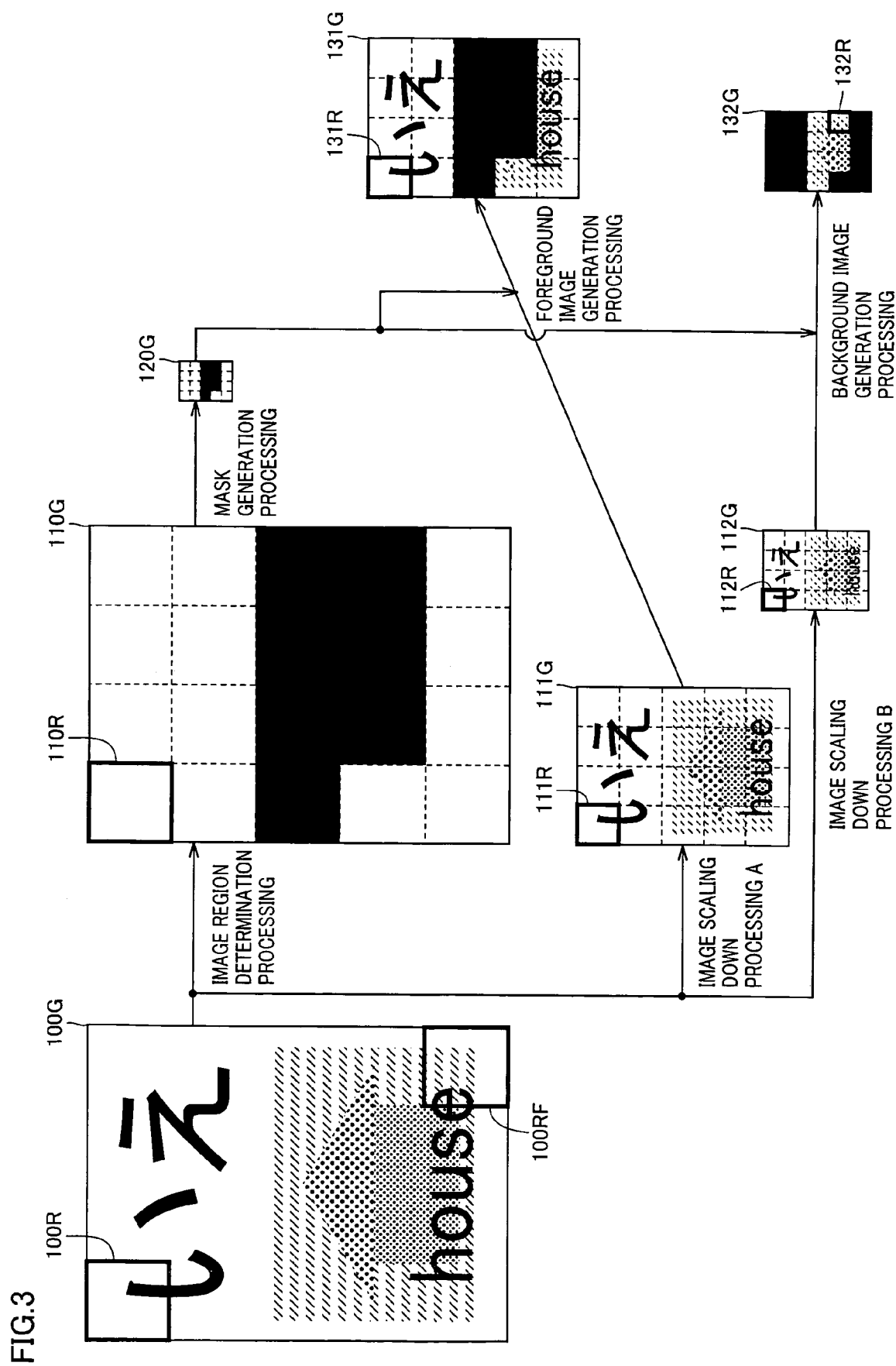
FIG. 3 illustrates an image processed in the image coding apparatus in the first embodiment.

FIG. 3 illustrates an image processed in image coding apparatus 1000 in the first embodiment. As it is difficult to faithfully express the resolution of each image shown in FIG.

3 in the drawing, FIG. 3 illustrates relative relation by assuming relation between resolution corresponding to combination number "1" in a data table T100 in FIG. 6 which will be described later and the block size.

Referring to FIG. 3, an input image 100G is an image based on the input image data. Input image 100G is an image in which a character and a photograph are arranged. It is noted that a character is arranged also within a region where the photograph is displayed.

The image read in the image data reading processing in step S101 is, for example, an image within a region 100R corresponding to a prescribed block. Region 100R has, for example, a size of 32 pixels in horizontal direction and 32 pixels in vertical direction. Each time the processing in step S101 is repeated, a position of region 100R is moved to a position not overlapping the previous position. If the processing in step S101 is performed for the first time, region 100R is positioned at the upper left of input image 100G.

Specifically, each time the processing in step S101 is repeated, the position of region 100R moves to the right. If region 100R is positioned at the right end of input image 100G, in the next processing in step S101, the position of region 100R moves to the left end of input image 100G, downward by the size of region 100R in the vertical direction. As a result of repetition of the processing above, finally, region 100R is positioned at the lower right of input image 100G (position of a region 100RF).

Referring again to FIG. 2, the read input image data in a unit of prescribed block is input to block image region determination unit 101, first image scaling-down unit 102 and second image scaling-down unit 103. In the following, the image data in a unit of block is also referred to as the block image data. In addition, as described previously, the image in a unit of block is referred to as the block image. Moreover, the block image data in the case that the image data is the input image data is also referred to as input block image data. The block image in the case that the image is the input image is also referred to as the input block image. Thereafter, the process proceeds to step S110.

In step S110, the image region determination processing is performed. In the image region determination processing, block image region determination unit 101 subjects the input block image data input in step S101 to the processing described later. Block image region determination unit 101 performs the processing described later in a unit of prescribed block image (for example, an image within region 100R) instead of a unit of each pixel in region 100R, which is one feature of the present invention. The image region determination processing is the processing for determining whether an image region to be processed (block image) is the image region (block image) where a character or a line is present.

Figure 4:
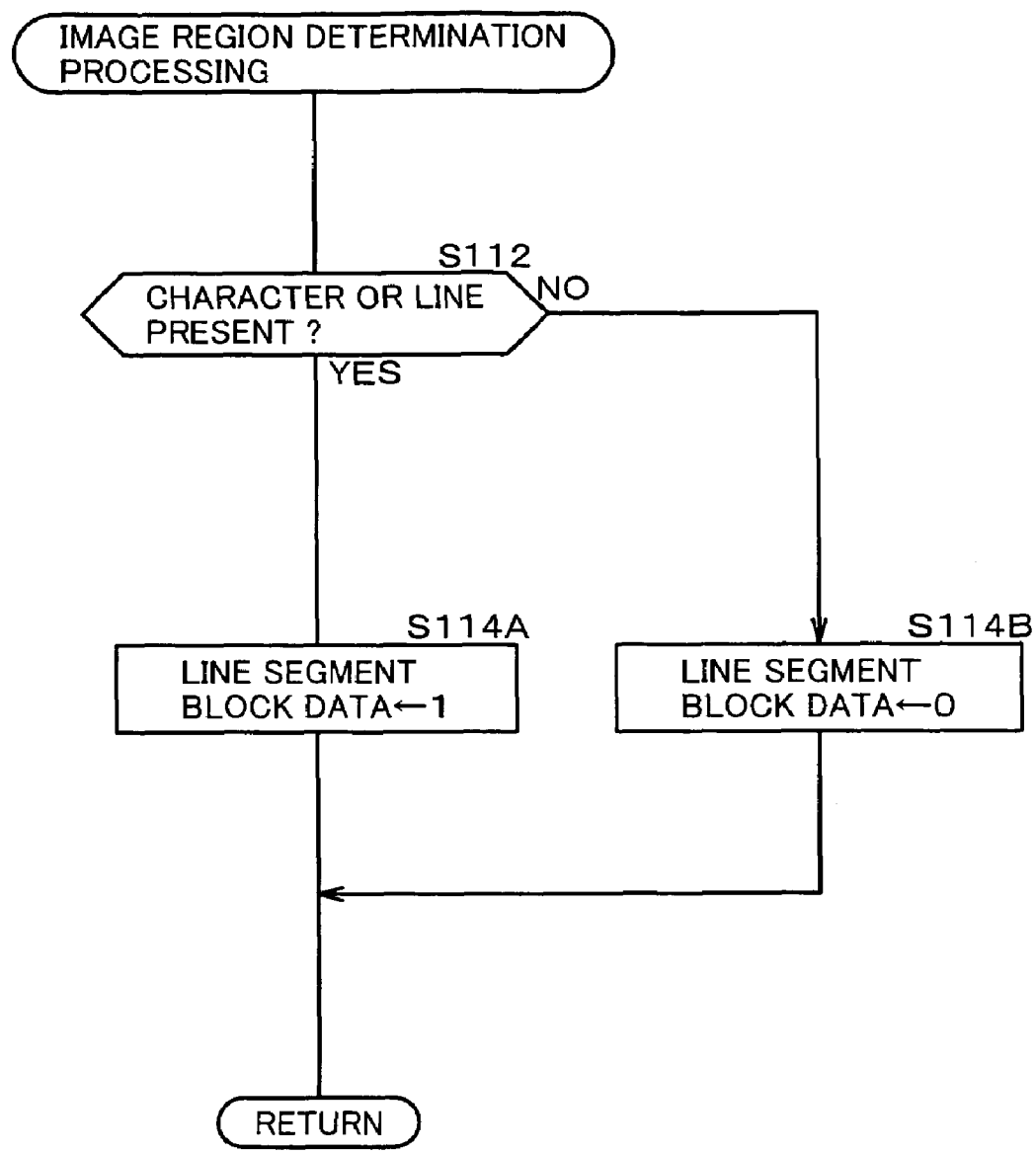
FIG. 4 is a flowchart of image region determination processing.

FIG. 4 is a flowchart of the image region determination processing. Referring to FIG. 4, in step S112, block image region determination unit 101 determines whether a character or a line is present within the input block image (image within region 100R). Determination is made based on a pixel-by-pixel mask plane generated in advance.

The pixel-by-pixel mask plane is constituted of a plurality of pieces of data indicating whether each pixel in the input image is a pixel corresponding to a character or a line drawing portion (hereinafter, also referred to as character determination data). Therefore, the pixel-by-pixel mask plane is constituted of character determination data in the number of pieces as many as total pixels in the input image (for example, input image 100G). In addition, a plurality of pieces of character determination data correspond to a plurality of pixels (total pixels) in the input image respectively.

In the present embodiment, if the character determination data corresponds to a pixel corresponding to the character or the line drawing portion of the input image, the character determination data is set to "1". On the other hand, if the character determination data corresponds to a pixel not corresponding to the character or the line drawing portion of the input image, the character determination data is set to "0".

Creation of the pixel-by-pixel mask plane is carried out, for example, by using luminance data of each pixel of the input image, based on the technique disclosed in Japanese Patent Laying-Open No. 02-123479 or Japanese Patent Laying-Open No. 02-155087. Specifically, control unit 120 applies a ridge pixel detection pattern prepared in advance so as to detect the ridge pixel from the input image data stored in storage unit 140. Then, control unit 120 performs counting in a unit of predetermined region, determines whether the pixel corresponds to the character or the line drawing portion based on the counting value, and sets "1" or "0" for each of the plurality of pieces of character determination data. Control unit 120 causes storage unit 140 to store the pixel-by-pixel mask plane generated in the processing above. It is noted that the pixel-by-pixel mask plane may be generated in advance outside image coding apparatus 1000 and stored in storage unit 140.

Specific processing for determining whether a character or a line is present within the input block image (image within region 100R) will now be described.

Block image region determination unit 101 refers to the pixel-by-pixel mask plane stored in storage unit 140, and determines whether there is one or more piece of character determination data set to "1" among the plurality of pieces of character determination data corresponding to the plurality of pixels in the input block image (image within region 100R) respectively. If there is one or more piece of character determination data set to "1", it is determined that there is a character or a line in the block image. It is noted that the number of pieces of the character determination data set to "1", serving as the criterion, is not limited to 1 or more, and the number may be set to N (natural number not smaller than 2). In the following, the block image in which a character or a line is present is also referred to as a line segment block image. In addition, the block image in which no character or line is present is also referred to as a non-line segment block image.

If all of the plurality of pieces of character determination data are set to "1", block image region determination unit 101 may determine the block image to be determined as the line segment block image. If there is one or more piece of character determination data set to "0" among the plurality of pieces of character determination data, block image region determination unit 101 may determine the block image to be determined as the non-line segment block image.

If it is determined as YES in step S112, the process proceeds to step S114A. On the other hand, if it is determined as NO in step S112, the process proceeds to step S114B.

In step S112, it is possible to determine whether the block image to be determined is the line segment block image or the non-line segment block image, without using the pixel-by-pixel mask plane generated in advance.

A method of determining whether the block image to be determined is the line segment block image or the non-line segment block image by using a plurality of pixel values within the block image to be determined, instead of using the pixel-by-pixel mask plane, will now be described.

This method employs the technique disclosed in Japanese Patent Laying-Open No. 05-014701. Specifically, initially, block image region determination unit 101 finds a difference between a maximum density level and a minimum density level, among the plurality of pixel values within the block image to be determined. Then, block image region determination unit 101 sets a threshold value (for example, an intermediate level) based on data of the difference in the density level. Thereafter, block image region determination unit 101 extracts points where the density level attains relative maximum and relative minimum when the pixel within the block is scanned in a prescribed direction, and finds a height of a pulse based on the difference between the relative maximum and relative minimum pixel levels. Thereafter, block image region determination unit 101 counts the number of cases that the found height of the pulse is greater than the threshold value above. Then, block image region determination unit 101 can determine that the block image to be determined is the line segment block image or the non-line segment block image, based on whether the count value is smaller than a prescribed value.

In addition, another method employs the technique disclosed in Japanese Patent Laying-Open No. 05-114045. Specifically, initially, block image region determination unit 101 calculates a value obtained by dividing "the total number of pixels having density not lower than a prescribed threshold value (for example, a luminance value not larger than the threshold value) within the block image to be determined" by "the total number of pixels within the block image to be determined" (hereinafter, also referred to as black pixel density). Then, block image region determination unit 101 can determine whether the block image to be determined is the line segment block image or the non-line segment block image based on the level of the black pixel density. Namely, tendency that the black pixel density is relatively low in the line segment block image is utilized.

Moreover, another method employs the technique disclosed in Japanese Patent Laying-Open No. 05-114045. Specifically, initially, block image region determination unit 101 calculates a value obtained by dividing "the total number of pixels having a pixel value not smaller than a prescribed threshold value (for example, a luminance value) within the block image to be determined" by "the total number of pixels within the block image to be determined" (hereinafter, also referred to as black pixel density). Then, block image region determination unit 101 can determine whether the block image to be determined is the line segment block image or the non-line segment block image based on the level of the black pixel density. Namely, tendency that the black pixel density is relatively low in the line segment block image is utilized.

Further, another method utilizes not only a character and a line but also an edge portion. Specifically, initially, block image region determination unit 101 applies a derivative (or differential) operator such as Sobel operator to the block image to be determined in horizontal and vertical directions, adds the absolute value of the result of application in a unit of corresponding pixel, and calculates magnitude of tilt.

Thereafter, block image region determination unit 101 determines a pixel in which calculated tilt is greater than the threshold value as the character/line or the edge portion. If the block image to be determined includes the character/line or the edge portion, block image region determination unit 101 can determine that the block image to be determined is the line segment block image including the character/line or the edge portion.

It is noted that determination as to whether the block image to be determined includes the character/line or the edge portion may be made using the pixel value of the block image to be determined and the pixel value around the block image.

In step S114A, block image region determination unit 101 sets the line segment block data to "1". The line segment block data is data indicating whether the block image to be processed is the line segment block image. The line segment block data set to "1" indicates that the block image to be processed is the line segment block image. On the other hand, the line segment block data set to "0" indicates that the block image to be processed is the non-line segment block image.

Block image region determination unit 101 transmits the line segment block data set to "1" to mask generation unit 104. In addition, block image region determination unit 101 stores the line segment block data set to "1" in temporary storage unit 130 in association with the information specifying the block image to be processed. Thereafter, the image region determination processing ends, the process returns to the image coding processing in FIG. 2, and the process proceeds to step S120 subsequent to step S110.

In step S114B, block image region determination unit 101 sets the line segment block data to "0". Block image region determination unit 101 transmits the line segment block data set to "0" to mask generation unit 104. In addition, block image region determination unit 101 stores the line segment block data set to "0" in temporary storage unit 130 in association with the information specifying the block image to be processed. Thereafter, the image region determination processing ends, the process returns to the image coding processing in FIG. 2, and the process proceeds to step S120 subsequent to step S110.

Referring again to FIG. 3, an image 110G is an image representing a state of the line segment block data set in the image region determination processing in a visually recognizable manner. If input image 100G is subjected to the image region determination processing described previously in a unit of block image and the block image to be processed is determined as the line segment block image, all pixels within that block image are displayed in white (for example, pixel value "1"). On the other hand, if the block image to be processed is determined as the non-line segment block image, all pixels within that block image are displayed in black (for example, pixel value "0").

Referring again to FIG. 2, in step S120, the mask generation processing is performed. In the mask generation processing, the mask data is generated based on the line segment block data set in the image region determination processing. The mask data is the data indicating whether the block image to be processed is valid as the foreground image. The mask data is the data of 1 bit indicating either "0" or "1".

If the mask data is set to "1", the block image to be processed is valid as the foreground image. On the other hand, if the mask data is set to "0", the block image to be processed is invalid as the foreground image. The mask data indicates one value for one block image processed in the image region determination processing in step S110. It is noted that the mask data may indicate one value for all pixels within one block image processed in the image region determination processing in step S110.

Figure 5:
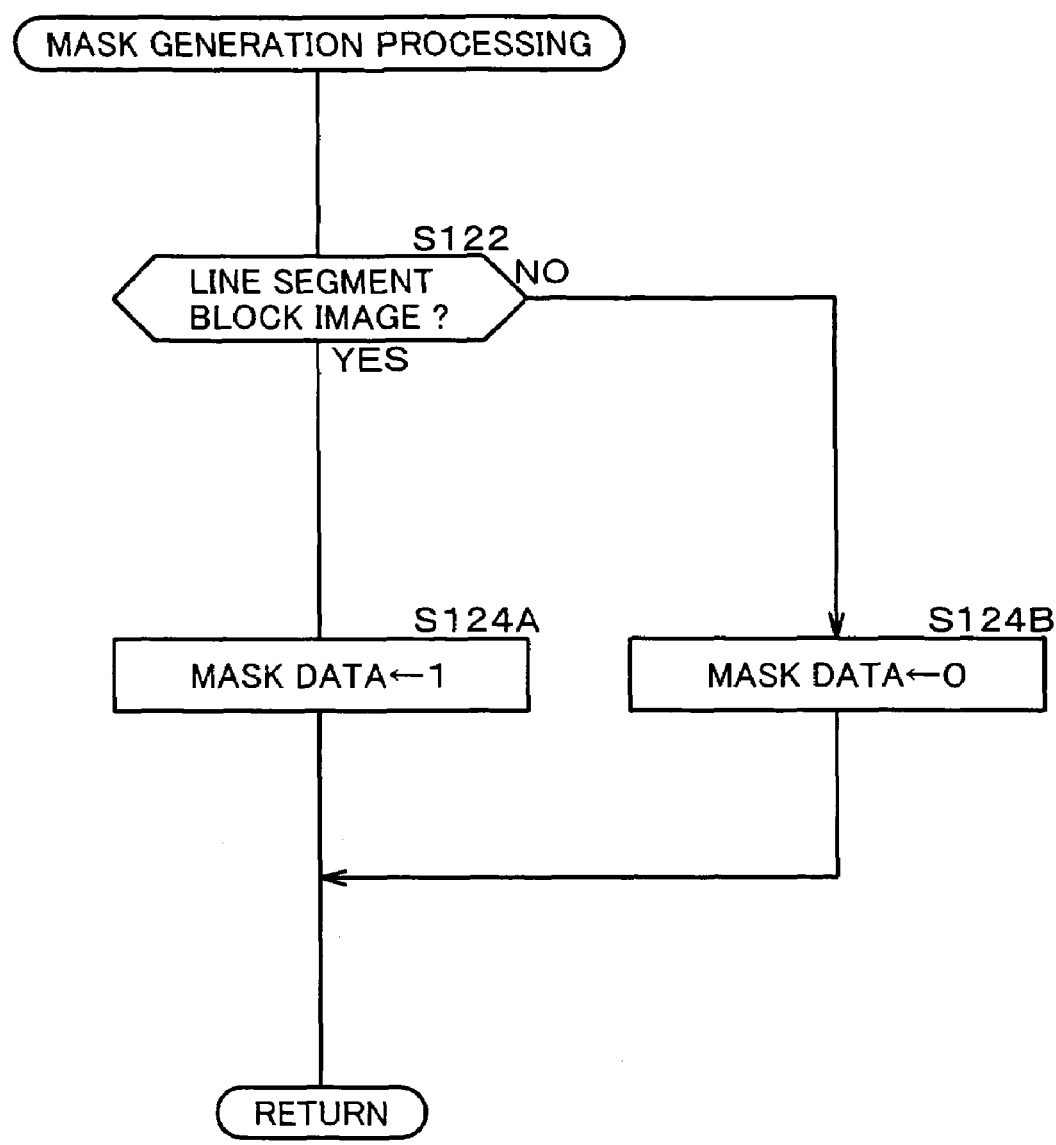
FIG. 5 is a flowchart of mask generation processing.

FIG. 5 is a flowchart of the mask generation processing. Referring to FIG. 5, in step S122, whether the block image to be processed is the line segment block image or not is determined. Specifically, mask generation unit 104 determines whether the received line segment block data is set to "1". If it is determined as YES in step S122, the process proceeds to step S124A. On the other hand, if it is determined as NO in step S122, the process proceeds to step S124B.

In step S124A, mask generation unit 104 sets the mask data to "1". Namely, the block image to be processed becomes valid as the foreground image. Mask generation unit 104 transmits the mask data set to "1" to mask coding unit 107, foreground image generation unit 105 and background image generation unit 106. In addition, mask generation unit 104 stores the mask data set to "1" in temporary storage unit 130 in association with the information specifying the block image to be processed. Thereafter, the mask generation processing ends, the process returns to the image coding processing in FIG. 2, and the process proceeds to step S132 subsequent to step S120.

In step S124B, mask generation unit 104 sets the mask data to "0". Namely, the block image to be processed becomes invalid as the foreground image. Mask generation unit 104 transmits the mask data set to "0" to mask coding unit 107, foreground image generation unit 105 and background image generation unit 106. In addition, mask generation unit 104 stores the mask data set to "0" in temporary storage unit 130 in association with the information specifying the block image to be processed. Thereafter, the mask generation processing ends, the process returns to the image coding processing in FIG. 2, and the process proceeds to step S132 subsequent to step S120.

Referring again to FIG. 3, an image 120G is the image representing a state of the mask data set in the mask generation processing in a visually recognizable manner. As a result of the mask generation processing, the block image determined as valid as the foreground image is represented by one white pixel (for example, pixel value "1"). On the other hand, as a result of the mask generation processing, the block image determined as invalid as the foreground image is represented by one black pixel (for example, pixel value "0"). Here, resolution of image 120G is set to 18.75 dpi (dots per inch), which is obtained by dividing resolution of image 110G, 600 dpi, by 32 which is the number of pixels serving as a unit for the block image region determination processing. This is because one value is set for one block image.

Referring again to FIG. 2, in step S132, image scaling-down processing A is performed. In image scaling-down processing A, first image scaling-down unit 102 lowers the resolution of the input block image based on the input block image data input in step S101. That is, the input block image is scaled down. Scaling-down of the input block image is performed based on data table T100 described below.

FIG. 6 illustrates data table T100. Data table T100 is a table showing relation between the resolution of the image and the block size. Referring to FIG. 6, combination number represents the number for specifying combination of the resolution of the image and a corresponding block size. It is noted that the combination of the resolution of the image and the corresponding block size is not limited to those shown in data table T100.

For example, in combination number "1", the resolutions of the input image, the foreground image and the background image are set to 600 dpi, 300 dpi and 150 dpi, respectively. In this case, the image region determination processing is performed, assuming a block image having a size of 32 pixels in horizontal direction and 32 pixels in vertical direction as one unit. In addition, the foreground image is processed for each block image of a size of 16 pixels in horizontal direction and 16 pixels in vertical direction. Moreover, the background image is processed for each block image of a size of 8 pixels in horizontal direction and 8 pixels in vertical direction. As this is also the case for combination numbers "2" to "4", detailed description will not be repeated.

Here, a criterion in determining the number of pixels of the block size will be described. In data table T100 showing relation between the resolution of the image and the block size, each of the number of pixels in horizontal direction and the number of pixels in vertical direction of the block size is a multiple of 8. The reason for using a multiple of 8 is that foreground image coding unit 108 and background image coding unit 109 code the image in accordance with the JPEG scheme.

As is known, in the JPEG scheme, processing is performed for each block image of a size of 8 pixels×8 pixels. In the JPEG scheme, in the processing for each block image, initially, DCT (discrete cosine transform) is performed, and one DC (direct current) component value and 63 AC (alternate current) component values are calculated. The 64 calculated values are quantized by division of the same using a quantization table defining quantization width corresponding to each component.

In addition, the DC component value is subjected to Huffman coding, utilizing a differential value from the DC component value of the block image processed immediately before. The AC component value is subjected to Huffman coding by performing zigzag scanning on 63 values within the block image. Huffman coding is lossless coding, and generally, irreversibility in the JPEG scheme originates from quantization error and error at the time of DCT calculation.

Therefore, deterioration in image quality caused when the image is coded using the JPEG scheme basically occurs within the block image (8 pixels×8 pixels) which is a unit for processing. Namely, deterioration in image quality within the block image occurs within the block image in an enclosed manner. Accordingly, deterioration in image quality of the block image to be subjected to JPEG processing, due to the value of the pixel outside the block image or by the block image in the surroundings, does not occur.

In the present invention, as shown in data table T100 showing relation between the resolution of the image and the size of the block image, the number of pixels in horizontal direction and the number of pixels in vertical direction of a size of the block image in each processing of image region determination, the foreground image and the background image are defined by a multiple of 8. In this manner, in generating the foreground image and the background image, an arbitrary pixel value can be set, in a unit of block image, to a block unnecessary at the time of image reproduction.

In other words, color bleed originating from the pixel value of the don't care pixel within the unnecessary block image can be prevented. Consequently, regardless of the pixel value set for the unnecessary block image, quality of the reproduced image can effectively be maintained constant.

As to the size of the block image in each processing of image region determination, the foreground image and the background image, a smallest size of the block image serving as a unit for processing of the image of lowest resolution (in the present embodiment, the background image) is preferably set to 8 pixels×8 pixels. In the following, the smallest size of the block image serving as a unit for processing of the image is also referred to as the smallest block image size.

In addition, each of the number of pixels in horizontal direction and the number of pixels in vertical direction in the block image serving as a unit for processing of the image having the resolution not lower than the lowest resolution (in the present embodiment, the input image and the foreground image) is preferably set to a value calculated in Equation (1) below.

the number of pixels=8×(resolution of the image to be processed)/(lowest resolution) (1)

As described above, by setting the smallest block image size to 8 pixels×8 pixels, image region separation accuracy can be maximized. Here, image region separation accuracy refers to accuracy in separating an image region (block image) where a character or a line is present and an image region (block image) where a character or a line is not present from each other. In addition, for an image not employing the smallest block image size as a unit for processing, a size of the block image is set by using the value calculated in Equation (1). The image information corresponding to one block image among the input image, the foreground image and the background image can thus indicate a relatively identical block image portion in the image.

Specifically, in combination number "1" in data table T100, the following result is obtained by substituting each value into Equation (1). Initially, the number of pixels in horizontal direction in the block image serving as the unit for processing in the image region determination processing is: 8×600/150=32. In addition, the number of pixels in horizontal direction in the block image serving as the unit for processing of the foreground image is: 8×300/150=16. It is noted that the number of pixels in horizontal direction in the block image serving as the unit for processing of the background image is set to 8, regardless of Equation (1).

In addition, in combination number "2" in data table T100, the following result is obtained by substituting each value into Equation (1). Initially, the number of pixels in horizontal direction in the block image serving as the unit for processing in the image region determination processing is: 8×600/300=16. In addition, the number of pixels in horizontal direction in the block image serving as the unit for processing of the foreground image is: 8×600/300=16. It is noted that the number of pixels in horizontal direction in the block image serving as the unit for processing of the background image is set to 8, regardless of Equation (1).

Moreover, in combination number "3" in data table T100, the following result is obtained by substituting each value into Equation (1). Initially, the number of pixels in horizontal direction in the block image serving as the unit for processing in the image region determination processing is: 8×600/150=32. In addition, the number of pixels in horizontal direction in the block image serving as the unit for processing of the foreground image is: 8×600/150=32. It is noted that the number of pixels in horizontal direction in the block image serving as the unit for processing of the background image is set to 8, regardless of Equation (1).

Further, in combination number "4" in data table T100, the following result is obtained by substituting each value into Equation (1). Initially, the number of pixels in horizontal direction in the block image serving as the unit for processing in the image region determination processing is: 8×300/150=16. In addition, the number of pixels in horizontal direction in the block image serving as the unit for processing of the foreground image is: 8×300/150=16. It is noted that the number of pixels in horizontal direction in the block image serving as the unit for processing of the background image is set to 8, regardless of Equation (1).

FIG. 7 illustrates relative relation between the resolution of each image and a size of the block image which is a unit for processing of each image. FIG. 7A shows relation of the resolution and a size of the block image serving as the unit for processing, of each of the input image, the foreground image and the background image, corresponding to each data of combination number "1" in data table T100.

Figure 7A:
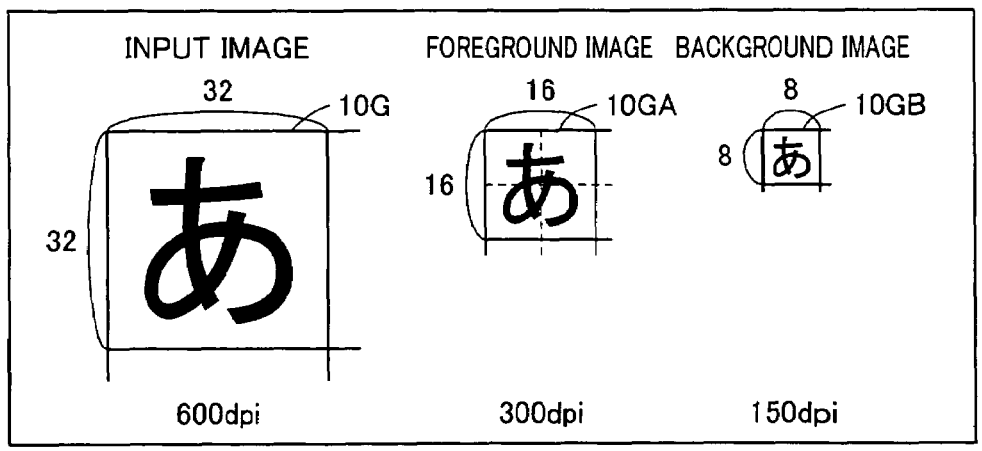
FIGS. 7A, 7B, 7C, and 7D illustrate relative relation between resolution of each image and a size of a block image which is a unit for processing of each image.
Figure 7B:
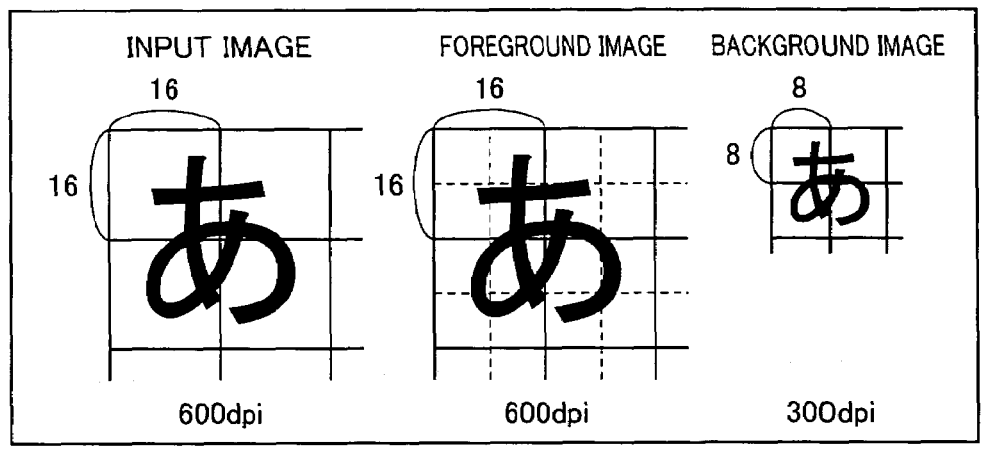

FIG. 7B shows relation of the resolution and a size of the block image serving as the unit for processing, of each of the input image, the foreground image and the background image, corresponding to each data of combination number "2" in data table T100.

Figure 7C:
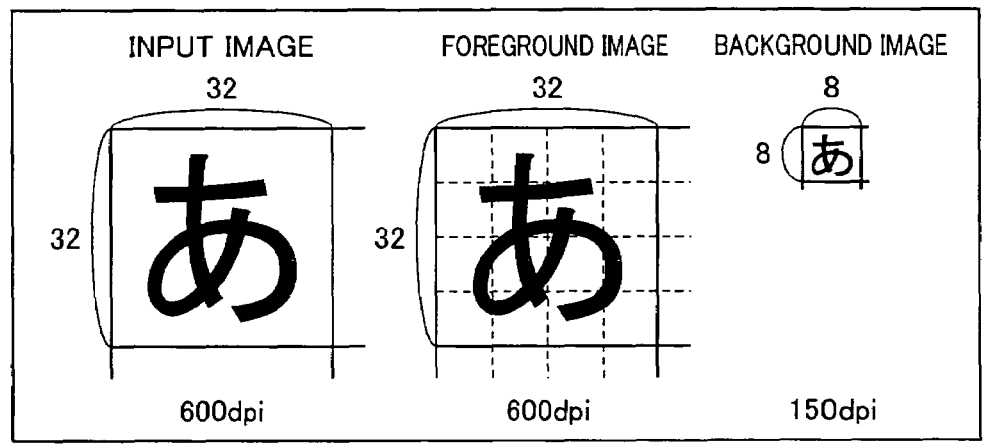

FIG. 7C shows relation of the resolution and a size of the block image serving as the unit for processing, of each of the input image, the foreground image and the background image, corresponding to each data of combination number "3" in data table T100.

Figure 7D:
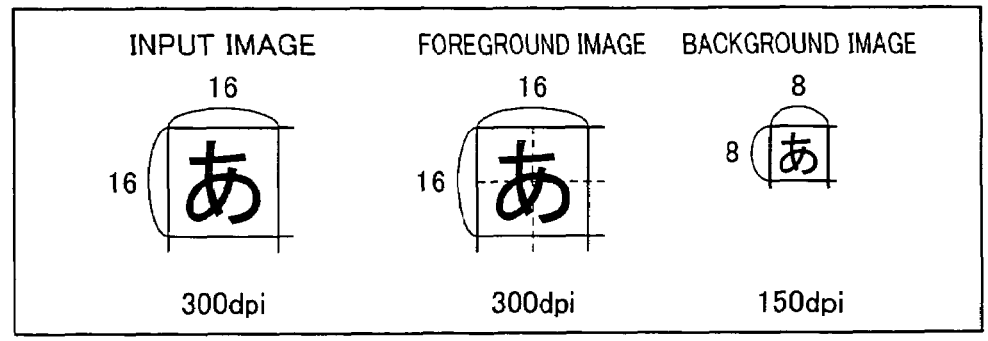

FIG. 7D shows relation of the resolution and a size of the block image serving as the unit for processing, of each of the input image, the foreground image and the background image, corresponding to each data of combination number "4" in data table T100.

For example, in combination number "1" in data table T100, the resolutions of the input image, the foreground image and the background image are set to 600 dpi, 300 dpi and 150 dpi, respectively.

Referring to FIG. 7A, a block image 10G is a block image serving as a unit for processing of the input image. A block image 10GA is a block image serving as a unit for processing of the foreground image. A block image 10GB is a block image serving as a unit for processing of the background image.

The sizes of block image 10G, block image 10GA and block image 10GB are set to 32 pixels×32 pixels, 16 pixels×16 pixels, and 8 pixels×8 pixels, respectively. The image information corresponding to one block image among the input image, the foreground image and the background image can thus indicate a relatively identical block image portion in the image. As shown in FIGS. 7B, 7C and 7D, as this is also the case with combination numbers "2" to "4" in data table T100, detailed description will not be repeated.

Referring again to FIG. 2, in step S132, first image scaling-down unit 102 scales down the input block image, for example, based on each data of combination number "1" in data table T100 and the input block image data input in step S101. For example, if the input block image input in step S101 has the size of 32 pixels×32 pixels, this image is scaled down to the block image of 16 pixels×16 pixels. As described previously, an already-existing interpolation method generally used for converting the resolution of an image, such as Nearest Neighbor method, Bilinear method, Bicubic method, and the like, is used for scaling-down processing.

Referring again to FIG. 3, a first scaled-down image 111G is an image constituted of a plurality of scaled-down block images obtained as a result of scaling down of all input block images performed by first image scaling-down unit 102 through image scaling-down processing A. The resolution of first scaled-down image 111G is set to half (300 dpi) that of the input image (600 dpi).

In step S132 (image scaling-down processing A), for example, the image within region 100R within input image 100G is scaled down to the image within region 111R within first scaled-down image 111G. In the following, the image scaled down in image scaling-down processing A is also referred to as the first scaled-down block image.

Referring again to FIG. 2, in step S132 (image scaling-down processing A), first image scaling-down unit 102 transmits the data of the generated first scaled-down block image to foreground image generation unit 105. Thereafter, the process proceeds to step S140.

In step S140, the foreground image generation processing is performed. In the foreground image generation processing, the first scaled-down block image generated in step S132 is used to generate the foreground image, based on the mask data set in step S120.

Figure 8:
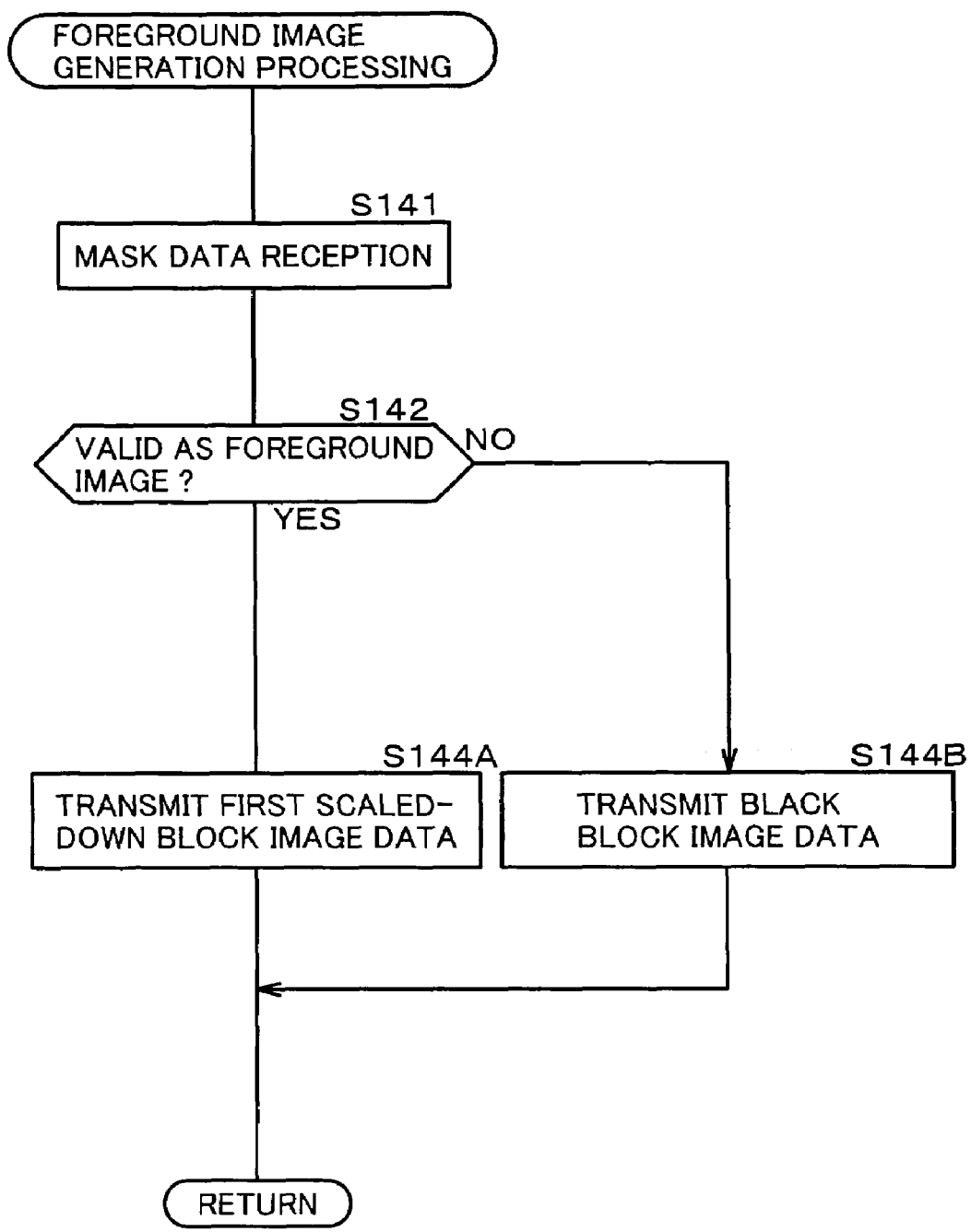
FIG. 8 is a flowchart of foreground image generation processing.

FIG. 8 is a flowchart of the foreground image generation processing. Referring to FIG. 8, in step S141, foreground image generation unit 105 receives the mask data transmitted by mask generation unit 104 in the mask generation processing described previously. Thereafter, the process proceeds to step S142.

In step S142, whether the first scaled-down block image transmitted from first image scaling-down unit 102 is valid as the foreground image or not is determined. Specifically, foreground image generation unit 105 determines whether the received mask data has been set to "1" or not. If the mask data is set to "1", the first scaled-down block image is valid as the foreground image. On the other hand, if the mask data is set to "0", the first scaled-down block image is invalid as the foreground image.

If it is determined as YES in step S142, the process proceeds to step S144A. On the other hand, if it is determined as NO in step S142, the process proceeds to step S144B.

In step S144A, foreground image generation unit 105 transmits the data of the received first scaled-down block image to foreground image coding unit 108. Thereafter, the foreground image generation processing ends, the process returns to the image coding processing in FIG. 2, and the process proceeds to step S150 subsequent to step S140.

In step S144B, the data of the image, in which all pixels in the image as large as the first scaled-down block image (for example, image of a size of 16×16) are in black (pixel value "0") (hereinafter, also referred to as black block image), is transmitted to foreground image coding unit 108. Thereafter, the foreground image generation processing ends, the process returns to the image coding processing in FIG. 2, and the process proceeds to step S150 subsequent to step S140.

Referring again to FIG. 3, a foreground image 131G is an image constituted of data of all block images transmitted from foreground image generation unit 105 to foreground image coding unit 108. The resolution of foreground image 131G is the same as that of first scaled-down image 111G, that is, 300 dpi. As a result of the foreground image generation processing, the block image within foreground image 131G corresponding to the first scaled-down block image determined as valid as the foreground image becomes the determined first scaled-down block image. On the other hand, as a result of the foreground image generation processing, all pixels within the block image within foreground image 131G corresponding to the first scaled-down block image determined as invalid as the foreground image are in black (pixel value "0").

The image transmitted in step S144A is, for example, the image within region 131R within foreground image 131G. In addition, the image transmitted in step S144B is, for example, the black block image within foreground image 131G.

Referring again to FIG. 2, in step S150, the foreground image coding processing is performed. In the foreground image coding processing, foreground image coding unit 108 subjects the image received from foreground image generation unit 105 (for example, image of a size of 16×16) to lossy coding. The JPEG scheme in which the processing is performed in a unit of block is employed as the coding scheme for lossy coding. It is noted that the coding scheme for lossy coding is not limited to the JPEG scheme, and another coding scheme performing processing in a unit of block may be employed. Foreground image coding unit 108 transmits the data that has been subjected to lossy coding (hereinafter, also referred to as foreground image block coded data) to format unit 110. Thereafter, the process proceeds to step S152.

In step S152, image scaling-down processing B is performed. In image scaling-down processing B, second image scaling-down unit 103 scales down the input block image, for example, based on each data of combination number "1" in data table T100 in FIG. 6 and the input block image data input in step S101. For example, if the input block image input in step S101 has the size of 32 pixels×32 pixels, this image is scaled down to the block image of 8 pixels×8 pixels. As described previously, an already-existing interpolation method generally used for converting the resolution of an image, such as Nearest Neighbor method, Bilinear method, Bicubic method, and the like, is used for scaling-down processing.

Referring again to FIG. 3, a second scaled-down image 112G is an image constituted of a plurality of scaled-down block images obtained as a result of scaling-down of all input block images performed by second image scaling-down unit 103. The resolution of second image scaling-down unit 103 is set to one quarter (150 dpi) that of the input image (600 dpi).

In step S152 (image scaling-down processing B), for example, the image within region 100R within input image 100G is scaled down to the image within region 112R within second scaled-down image 112G (for example, the image of the size of 8 pixels×8 pixels). In the following, the image scaled down in image scaling-down processing B is also referred to as the second scaled-down block image (for example, the image of the size of 8 pixels×8 pixels).

Referring again to FIG. 2, in step S152 (image scaling-down processing B), second image scaling-down unit 103 transmits the data of the generated second scaled-down block image to background image generation unit 106. Thereafter, the process proceeds to step S160.

In step S160, the background image generation processing is performed. In the background image generation processing, the second scaled-down block image generated in step S152 is used to generate the background image, based on the mask data set in step S120.

Figure 9:
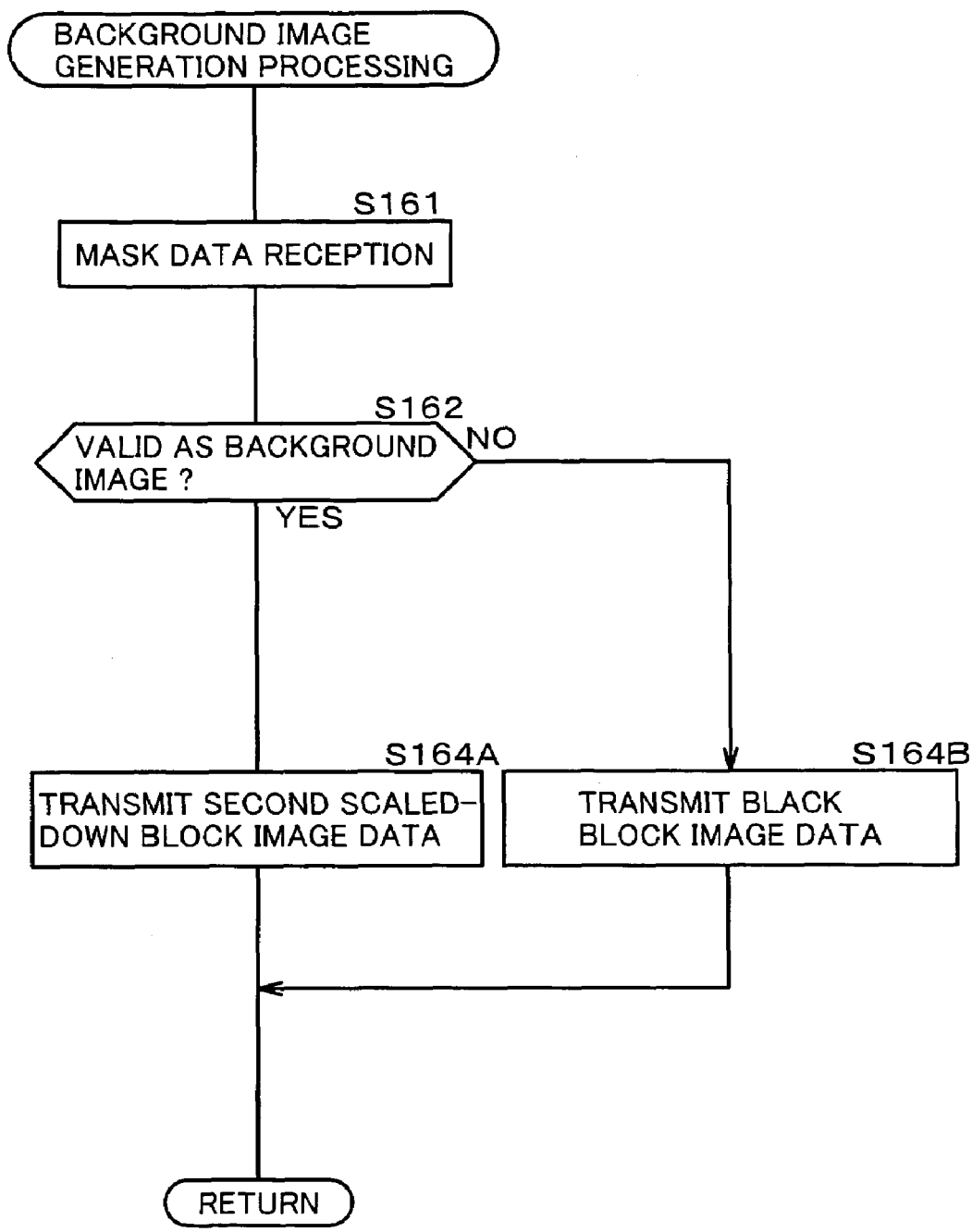
FIG. 9 is a flowchart of background image generation processing.

FIG. 9 is a flowchart of the background image generation processing. Referring to FIG. 9, in step S161, background image generation unit 106 receives the mask data transmitted by mask generation unit 104 in the mask generation processing described previously. Thereafter, the process proceeds to step S162.

In step S162, whether the second scaled-down block image transmitted from second image scaling-down unit 103 is valid as the background image or not is determined. Specifically, background image generation unit 106 determines whether the received mask data has been set to "0" or not. If the mask data is set to "0", the second scaled-down block image is valid as the background image. On the other hand, if the mask data is set to "1", the second scaled-down block image is invalid as the background image.

If it is determined as YES in step S162, the process proceeds to step S164A. On the other hand, if it is determined as NO in step S162, the process proceeds to step S164B.

In step S164A, background image generation unit 106 transmits the data of the received second scaled-down block image to background image coding unit 109. Thereafter, the background image generation processing ends, the process returns to the image coding processing in FIG. 2, and the process proceeds to step S170 subsequent to step S160.

In step S164B, the data of the image, in which all pixels in the image as large as the second scaled-down block image (for example, image of a size of 8×8) are in black (pixel value "0") (hereinafter, also referred to as black block image), is transmitted to background image coding unit 109. Thereafter, the background image generation processing ends, the process returns to the image coding processing in FIG. 2, and the process proceeds to step S170 subsequent to step S160.

Referring again to FIG. 3, a background image 132G is an image constituted of data of all block images transmitted from background image generation unit 106 to background image coding unit 109. The resolution of background image 132G is the same as that of second scaled-down image 112G, that is, 150 dpi. As a result of the background image generation processing, the block image within background image 132G corresponding to the second scaled-down block image determined as invalid as the foreground image becomes the determined second scaled-down block image. On the other hand, as a result of the foreground image generation processing, all pixels within the block image within background image 132G corresponding to the second scaled-down block image determined as valid as the foreground image are in black (pixel value "0"). The image transmitted in step S164A is, for example, the image within region 132R within background image 132G. In addition, the image transmitted in step S164B is, for example, the black block image within background image 132G.

Referring again to FIG. 2, in step S170, the background image coding processing is performed. In the background image coding processing, background image coding unit 109 subjects the image received from background image generation unit 106 (for example, image of a size of 8×8) to lossy coding. The JPEG scheme in which the processing is performed in a unit of block is employed as the coding scheme for lossy coding. It is noted that the coding scheme for lossy coding is not limited to the JPEG scheme, and another coding scheme performing processing in a unit of block may be employed. Background image coding unit 109 transmits the data that has been subjected to lossy coding (hereinafter, also referred to as background image block coded data) to format unit 110. Thereafter, the process proceeds to step S172.

In step S172, whether the processing for the entire input image has ended or not is determined. Specifically, control unit 120 determines whether the input block image read in the processing in step S101 is the block image at the lower right within the input image (image within region 100RF).

If it is determined as YES in step S172, the process proceeds to step S174. On the other hand, if it is determined as NO in step S172, the processing in step S101 is again repeated.

In step S174, mask coding processing is performed. In the mask coding processing, mask coding unit 107 reads from temporary storage unit 130, the mask layer data constituted of a plurality of pieces of mask data (binary data) generated as a result of repetition of step S120. The plurality of pieces of mask data are data corresponding to the plurality of block images within the input image, respectively. Then, mask coding unit 107 subjects the mask layer data constituted of the plurality of pieces of mask data to lossless coding.

MMR representing the coding scheme suitable for lossless coding of the binary image is used as lossless coding. It is noted that the lossless coding is not limited to MMR, and any coding scheme suitable for lossless coding of the binary image (such as MR and JBIG described previously) may be employed. Mask coding unit 107 transmits the coded data (hereinafter, also referred to as mask coded data) to format unit 110. Thereafter, the process proceeds to step S180.

In step S180, format processing is performed. In the format processing, format unit 110 associates the received mask coded data, a plurality of pieces of foreground image block coded data and a plurality of pieces of background image block coded data with each other. Association is carried out by using a highly versatile data format.

Here, the plurality of pieces of foreground image block coded data are a plurality of pieces of data received from foreground image coding unit 108 as a result of repetition of the processing in step S150. In the following, the data constituted of the plurality of pieces of foreground image block coded data is also referred to as foreground image coded data.

In addition, the plurality of pieces of background image block coded data are a plurality of pieces of data received from background image coding unit 109 as a result of repetition of the processing in step S170. In the following, the data constituted of the plurality of pieces of background image block coded data is also referred to as background image coded data.

PDF of Adobe (trademark) is one of the highly versatile data formats. It is noted that the highly versatile data format is not limited to PDF of Adobe (trademark), and other data formats may be employed.

For example, if the mask coded data is in an MMR form defined in ITU-T recommendation T.6 and if the foreground image coded data and the background image coded data are in the JPEG form, format unit 110 performs the following association processing.

In the association processing, format unit 110 creates associated data obtained by associating the mask coded data, the foreground image coded data and the background image coded data with each other, based on the PDF form of Adobe (trademark). Then, format unit 110 generates the versatile integrated data described previously, by integrating the mask coded data, the foreground image coded data, the background image coded data and the associated data into one piece of coded image data.

If the versatile integrated data is decoded, for example, decoding is performed by using an image obtained by decoding the foreground image coded data with JPEG (hereinafter, also referred to as decoded foreground image), an image obtained by decoding the background image coded data with JPEG (hereinafter, also referred to as decoded background image), and a plurality of pieces of mask data obtained by decoding the mask coded data.

Specifically, initially, if the decoded foreground image and the decoded background image are different from each other in size, the processing for scaling up the decoded background image to a size as large as the decoded foreground image is performed. Thereafter, the decoded background image is set as the image in a lowermost layer, and overwritten with the block image within the decoded foreground image corresponding to the mask data set to "1", in a corresponding position within the decoded background image. By repeating the processing above, the versatile integrated data is decoded and the input image before coding can be obtained.

The description above has been provided on the premise that a series of processing from step S101 to step S170 is performed in a unit of block image. So long as the image region determination in a unit of block image representing one feature of the present invention is performed and the mask layer data is subjected to lossless coding and the foreground image and the background image are subjected to lossy coding, however, the processing is not limited to the order described previously.

For example, initially, the entire input image is subjected to the mask generation processing, the foreground image generation processing and the background image generation processing, and the data obtained in each processing is stored in temporary storage unit 130. Thereafter, the mask layer data, the foreground image and the background image may be coded. Namely, the processing in steps S150, S170 may be performed after step S172 and before step S180.

In addition, the format processing in step S180 may be performed in a unit of block image. Namely, the processing in step S180 may be performed after step S170 and before step S172.

In addition, the processing may be performed in parallel and a plurality of types of processing may be performed simultaneously. For example, the processing in steps S132 to S150 and the processing in steps S152 to S170 may be performed in parallel after step S120.

In addition, step S174 may be arranged after step S120 and before step S172, a prescribed number of pieces of mask data may be accumulated (for example, two lines, that is, "the number of blocks in horizontal direction corresponding to the input image"×2), and the processing in step S174 may be performed each time update of one line proceeds.

In addition, image scaling-down processing A in step S132 and image scaling-down processing B in step S152 may be performed in different unit for processing, instead of a unit of block image read in step S101.

As described above, in the present embodiment, the input image to be processed is processed separately in a plurality of layers. The plurality of layers consist of the mask layer, the foreground layer and the background layer. In the foreground layer, the block image in a portion including a character, a line or an edge portion in the input image or the image obtained by scaling down the input image is subjected to lossy coding, to generate the foreground image.

In the background layer, the block image in a portion including none of a character, a line and an edge portion in the input image or the image obtained by scaling down the input image is subjected to lossy coding, to generate the background image. The foreground image including a character, a line or an edge portion has resolution equal to or greater than that of the background image.

Therefore, an effect of significant reduction in data capacity while minimizing deterioration in image quality of a character, a line or an edge portion is achieved.

In addition, in the present embodiment, image data and data of a plurality of layers are associated with each other in accordance with a highly versatile format, to create one piece of data. Therefore, an effect of creation of highly versatile data is achieved.

Moreover, in the present embodiment, whether or not the block image to be processed includes a character or a line is determined in a unit of prescribed block image. In addition, lossy coding processing (for example, coding processing using JPEG) is performed in a unit of prescribed block image. The lossy coding processing is performed in a unit of block.

Therefore, color bleed originating from the pixel value of the don't care pixel within the unnecessary block image can be prevented. Consequently, regardless of the pixel value set for the unnecessary block image, quality of the reproduced image can effectively be maintained constant.

Second Embodiment

The second embodiment is different from the first embodiment in generating the versatile integrated data without using the mask coded data. By setting a transparent color in the foreground image instead of the mask coded data, it is no longer necessary to use the mask coded data. Therefore, the data capacity of the versatile integrated data can be smaller than in the first embodiment.

Figure 10:
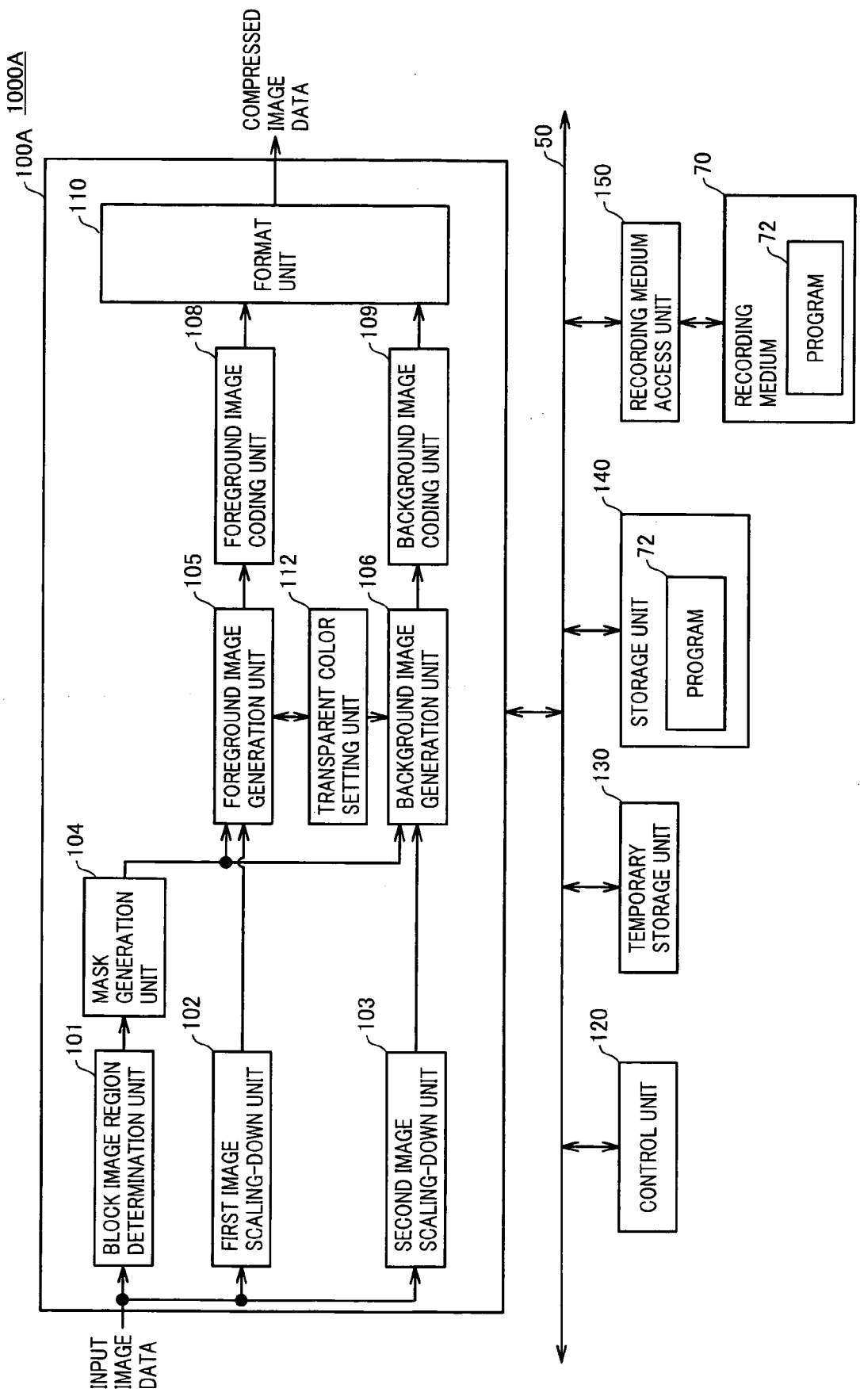
FIG. 10 is a block diagram showing a configuration of an image coding apparatus in a second embodiment.

FIG. 10 is a block diagram showing a configuration of an image coding apparatus 1000A in the second embodiment. Referring to FIG. 10, image coding apparatus 1000A is different from image coding apparatus 1000 in FIG. 1 in that an image processing unit 100A is included instead of image processing unit 100. As image coding apparatus 1000A is otherwise the same as image coding apparatus 1000, detailed description will not be repeated.

Image processing unit 100A is different from image processing unit 100 in FIG. 1 in that mask coding unit 107 is not included and a transparent color setting unit 112 is further included. It is noted that image processing unit 100A performs the processing which will be described later, in accordance with image coding program 72 stored in storage unit 140, in a manner similar to image processing unit 100.

Transparent color setting unit 112 is connected to foreground image generation unit 105 and background image generation unit 106. Foreground image generation unit 105 transmits information on the block image, for which transparent color should be set, to transparent color setting unit 112. Transparent color setting unit 112 receives information on the block image, for which transparent color should be set, from foreground image generation unit 105. Transparent color setting unit 112 transmits information of the block image, for which transparent color has been set, to foreground image generation unit 105 and background image generation unit 106.

Format unit 110 receives foreground image block coded data A from foreground image coding unit 108. Foreground image block coded data A is different from the foreground image block coded data described previously in including data indicating the transparent color. The transparent color can be expressed in such a manner that, for example, a pixel value of a pixel for which the transparent color is set is expressed by "0" and data indicating that the pixel value "0" indicates the transparent color is separately provided. Indication that a certain pixel value indicates the transparent color can be expressed, for example, by using PDF of Adobe (trademark). As image processing unit 100A is otherwise configured similarly to image processing unit 100, detailed description will not be repeated.

Transparent color setting unit 112 sets color information of the transparent color (for example, pixel value "0") for each pixel in the block image for which the transparent color should be set. It is noted that transparent color setting unit 112 is implemented, for example, by a dedicated LSI.

In addition, the processing performed by each of block image region determination unit 101, first image scaling-down unit 102, second image scaling-down unit 103, mask generation unit 104, foreground image generation unit 105, background image generation unit 106, foreground image coding unit 108, background image coding unit 109, format unit 110, and transparent color setting unit 112 described previously may be executed by the microprocessor of a common computer such as a personal computer or control unit 120, instead of the dedicated LSI.

Here, for example, image coding processing A which will be described later may be described as a program to be executed by a computer or control unit 120. The program is image coding program 72 and distributed in a manner recorded in recording medium 70.

If image coding processing A which will be described later is executed by the computer, image coding program 72 is recorded in recording medium 70, read in the storage unit included in the computer by the recording medium access unit included in the computer, and executed by a CPU.

If image coding processing A which will be described later is executed by control unit 120, image coding program 72 is recorded in recording medium 70 and executed by control unit 120.

Alternatively, image coding program 72 may be downloaded from another apparatus through a network such as the Internet.

Alternatively, a plurality of dedicated LSIs described previously and the microprocessor of the computer included in image processing unit 100A may be combined. Alternatively, a part or all of the plurality of dedicated LSIs described previously may be implemented as one dedicated LSI.

Specific processing in image coding apparatus 1000A in the second embodiment will now be described.

Figure 11:
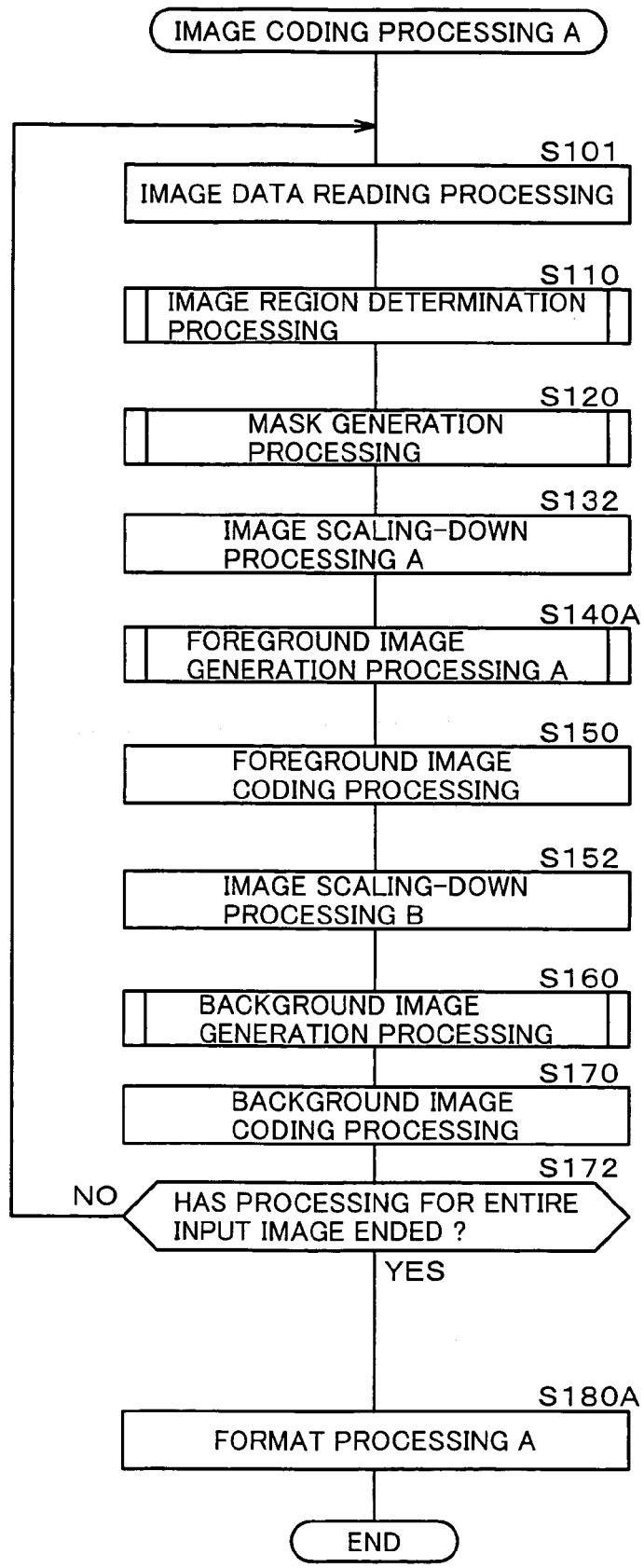
FIG. 11 is a flowchart of image coding processing A executed in the image coding apparatus in the second embodiment.

FIG. 11 is a flowchart of image coding processing A executed in image coding apparatus 1000A in the second embodiment. Referring to FIG. 11, image coding processing A is different from the image coding processing in FIG. 2 in that the processing in step S140A is performed instead of step S140, the processing in step S180A is performed instead of step S180, and the processing in step S174 is not performed. In the following, such difference will mainly be described.

Initially, in step S101, as described previously, image processing unit 100A reads the input image data stored in storage unit 140 in a unit of prescribed block. It is noted that the order of reading of the input image data is the same as in the processing in step S101 described previously, and therefore, detailed description will not be repeated.

Figure 12:
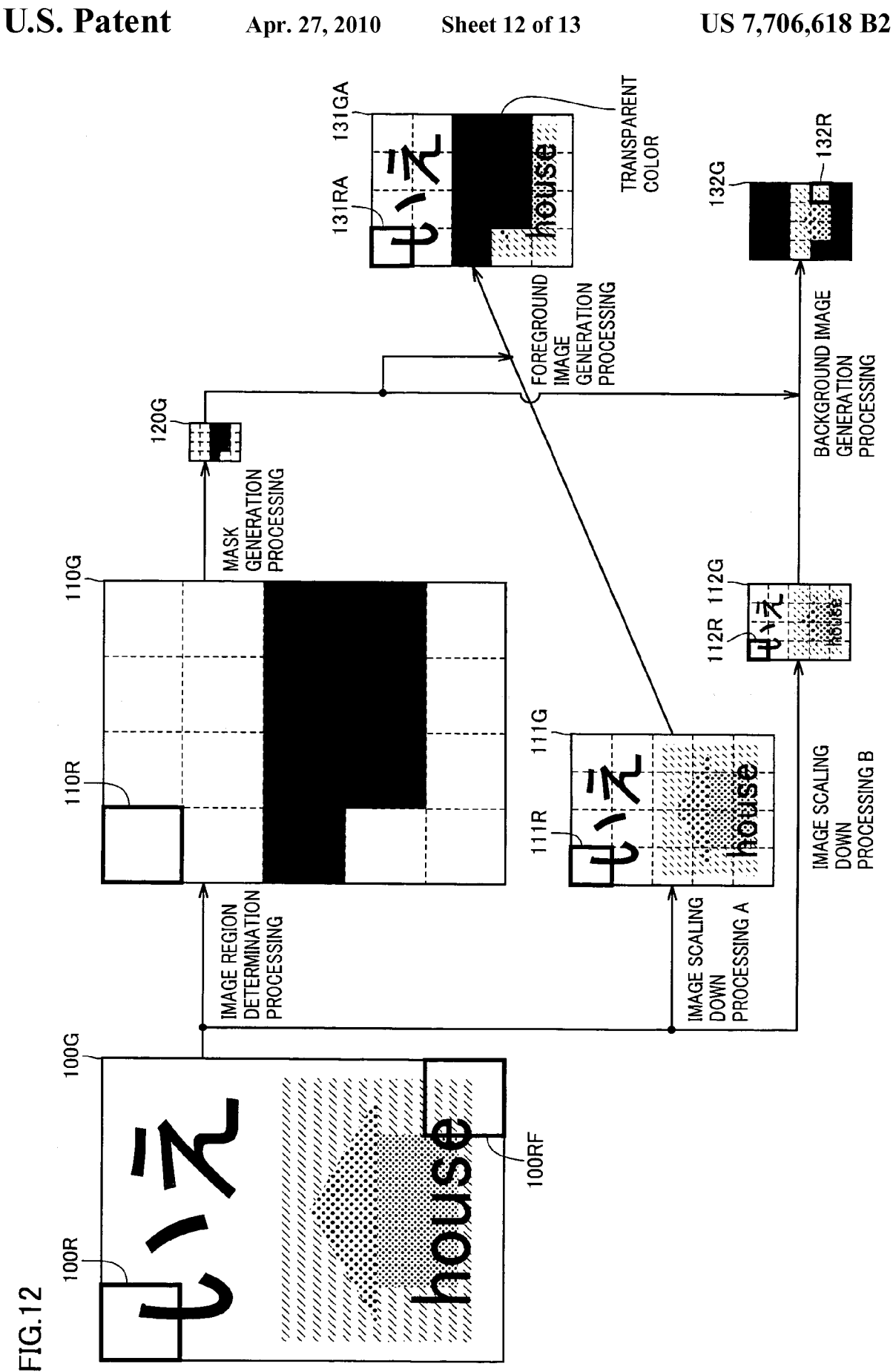
FIG. 12 illustrates an image processed in the image coding apparatus in the second embodiment.

FIG. 12 illustrates an image processed in image coding apparatus 1000A in the second embodiment. As it is difficult to faithfully express the resolution of each image shown in FIG. 12 in the drawing, FIG. 12 illustrates relative relation by assuming relation between the resolution corresponding to combination number "1" in data table T100 in FIG. 6 described previously and the block size.

Referring to FIG. 12, input image 100G is an image based on the input image data. As input image 100G has been described previously, detailed description will not be repeated.

Referring again to FIG. 11, the read input image data in a unit of prescribed block is input to block image region determination unit 101, first image scaling-down unit 102 and second image scaling-down unit 103. Thereafter, the process proceeds to step S110.

In step S110, the image region determination processing is performed as described previously.

Referring again to FIG. 12, image 110G is the image representing a state of the line segment block data set in the image region determination processing in a visually recognizable manner. As image 110G has been described previously, detailed description will not be repeated.

Referring again to FIG. 11, after the processing in step S110, the processing in step S120 is performed.

In step S120, as described previously, the mask generation processing is performed. It is noted that, in the mask generation processing in the present embodiment, the processing performed by mask generation unit 104 for transmitting the mask data to mask coding unit 107 in the mask generation processing in the first embodiment is not performed.

Referring again to FIG. 12, image 120G is the image representing a state of the mask data set in the mask generation processing in a visually recognizable manner. As image 120G has been described previously, detailed description will not be repeated.

Referring again to FIG. 11, after the processing in step S120, the processing in step S132 is performed.

In step S132, as described previously, image scaling-down processing A is performed.

Referring again to FIG. 12, first scaled-down image 111G is an image constituted of a plurality of scaled-down block images obtained as a result of scaling-down of all input block images performed by first image scaling-down unit 102 through image scaling-down processing A. As first scaled-down image 111G has been described previously, detailed description will not be repeated.

Referring again to FIG. 11, in step S132 (image scaling-down processing A), first image scaling-down unit 102 transmits the data of the generated first scaled-down block image to foreground image generation unit 105. Thereafter, the process proceeds to step S140A.

In step S140A, foreground image generation processing A is performed. In foreground image generation processing A, the first scaled-down block image generated in step S132 is used to generate the foreground image, based on the mask data set in step S120.

FIG. 13 is a flowchart of foreground image generation processing A. Referring to FIG. 13, in step S241, foreground image generation unit 105 receives the mask data transmitted by mask generation unit 104 in the mask generation processing described previously. Thereafter, the process proceeds to step S242.

In step S242, whether the first scaled-down block image transmitted from first image scaling-down unit 102 is valid as the foreground image or not is determined. Specifically, foreground image generation unit 105 determines whether the received mask data has been set to "1" or not. If the mask data is set to "1", the first scaled-down block image is valid as the foreground image. On the other hand, if the mask data is set to "0", the first scaled-down block image is invalid as the foreground image.

If it is determined as YES in step S242, the process proceeds to step S244A. On the other hand, if it is determined as NO in step S242, the process proceeds to step S244B.

In step S244A, foreground image generation unit 105 transmits the data of the received first scaled-down block image to foreground image coding unit 108. Thereafter, the foreground image generation processing ends, the process returns to the image coding processing A in FIG. 11, and the process proceeds to step S150 subsequent to step S140A.

In step S244B, the data of the image, in which all pixels in the image as large as the first scaled-down block image (for example, image of a size of 16×16) are in the transparent color (pixel value "0") (hereinafter, also referred to as transparent color block image), is transmitted to foreground image coding unit 108. It is noted that the pixel value of the transparent color (hereinafter, also referred to as the transparent color value) is a value identical to the pixel value of the black block image generated in background image generation processing which will be described later.

Thereafter, transparent color setting unit 112 stores information indicating that pixel value "0" in the foreground image indicates the transparent color in temporary storage unit 130. Thereafter, foreground image generation processing A ends, the process returns to image coding processing A in FIG. 11, and the process proceeds to step S150 subsequent to step S140A.

Referring again to FIG. 12, a foreground image 131GA is an image constituted of data of all block images transmitted from foreground image generation unit 105 to foreground image coding unit 108. The resolution of foreground image 131GA is the same as that of first scaled-down image 111G, that is, 300 dpi. As a result of foreground image generation processing A, the block image within foreground image 131GA corresponding to the first scaled-down block image determined as valid as the foreground image becomes the determined first scaled-down block image. On the other hand, as a result of foreground image generation processing A, all pixels within the block image within foreground image 131GA corresponding to the first scaled-down block image determined as invalid as the foreground image are in the transparent color (pixel value "0"). It is noted that foreground image 131GA expresses in black, the portion corresponding to pixel value "0" which indicates the transparent color.

The image transmitted in step S244A is, for example, the image within a region 131RA within foreground image 131GA. In addition, the image transmitted in step S244B is, for example, the block image in the transparent color (black) within foreground image 131G.

Referring again to FIG. 11, in step S150, as described previously, the foreground image coding processing is performed. Thereafter, the process proceeds to step S152.

In step S152, as described previously, image scaling-down processing B is performed.

Referring again to FIG. 12, second scaled-down image 112G is an image constituted of a plurality of scaled-down block images obtained as a result of scaling-down of all input block images performed by second image scaling-down unit 103. As second scaled-down image 112G has been described previously, detailed description will not be repeated.

Referring again to FIG. 11, in step S152 (image scaling-down processing B), second image scaling-down unit 103 transmits the data of the generated second scaled-down block image to background image generation unit 106. Thereafter, the process proceeds to step S160.

In step S160, as described previously, the background image generation processing is performed.

Referring again to FIG. 12, background image 132G is an image constituted of data of all block images transmitted from background image generation unit 106 to background image coding unit 109. The resolution of background image 132G is the same as that of second scaled-down image 112G, that is, 150 dpi. As a result of the background image generation processing, the block image within background image 132G corresponding to the second scaled-down block image determined as invalid as the foreground image becomes the determined second scaled-down block image. On the other hand, as a result of the foreground image generation processing, all pixels within the block image within background image 132G corresponding to the second scaled-down block image determined as valid as the foreground image (black block image) are in black (pixel value "0").

Referring again to FIG. 11, after the processing in step S160, the process proceeds to step S170.

In step S170, as described previously, the background image coding processing is performed. Thereafter, the process proceeds to step S172.

In step S172, as described previously, whether the processing for the entire input image has ended or not is determined. If it is determined as YES in step S172, the process proceeds to step S180A. On the other hand, if it is determined as NO in step S172, the processing in step S101 is again repeated.

In step S180A, format processing A is performed. In format processing A, format unit 110 associates a plurality of pieces of foreground image block coded data and a plurality of pieces of background image block coded data with each other. Association is carried out by using a highly versatile data format.

Here, as the plurality of pieces of foreground image block coded data have been described previously, detailed description will not be repeated. As described previously, the data constituted of a plurality of pieces of foreground image block coded data is also referred to as foreground image coded data.

In addition, as the plurality of pieces of background image block coded data have been described previously, detailed description will not be repeated. As described previously, the data constituted of a plurality of pieces of background image block coded data is also referred to as background image coded data.

PDF of Adobe (trademark) is one of the highly versatile data formats. It is noted that the highly versatile data format is not limited to PDF of Adobe (trademark), and other data formats may be employed.

For example, if the foreground image coded data and the background image coded data are in the JPEG form, format unit 110 performs the following association processing A.

In association processing A, format unit 110 creates associated data A obtained by associating the foreground image coded data and the background image coded data with each other, based on the PDF form of Adobe (trademark). Then, format unit 110 generates versatile integrated data A by integrating the foreground image coded data, the background image coded data and associated data A into one piece of coded image data.

If versatile integrated data A is decoded, for example, decoding is performed by using a decoded foreground image obtained by decoding the foreground image coded data with JPEG and a decoded background image obtained by decoding the background image coded data with JPEG.

Specifically, initially, if the decoded foreground image and the decoded background image are different from each other in size, the processing for scaling up the decoded background image to a size as large as the decoded foreground image is performed. Thereafter, the decoded foreground image is overwritten with the block image within the decoded background image corresponding to the block image within the decoded foreground image for which the transparent color has been set, in a corresponding position within the decoded foreground image. By repeating the processing above, versatile integrated data A is decoded and the input image before coding can be obtained.

The description above has been provided on the premise that a series of processing from step S101 to step S170 is performed in a unit of block image. So long as the image region determination in a unit of block image representing one feature of the present invention is performed and the foreground image and the background image are subjected to lossy coding, however, the processing is not limited to the order described previously.

For example, initially, the entire input image is subjected to the foreground image generation processing and the background image generation processing, and the data obtained in each processing is stored in temporary storage unit 130. Thereafter, the foreground image and the background image may be coded. Namely, the processing in steps S1150, S1170 may be performed after step S172 and before step S180A.

In addition, format processing A in step S180A may be performed in a unit of block image. Namely, the processing in step S180A may be performed after step S170 and before step S172.

In addition, the processing may be performed in parallel and a plurality of types of processing may be performed simultaneously. For example, the processing in steps S132 to S150 and the processing in steps S152 to S170 may be performed in parallel after step S120.

In addition, image scaling-down processing A in step S132 and image scaling-down processing B in step S152 may be performed in different unit for processing, instead of a unit of block image read in step S101.

As described previously, in the present embodiment, as versatile integrated data A is generated without using the mask coded data, not only the effect in the first embodiment but also an effect of further smaller data capacity of versatile integrated data A can be achieved.

(Color Space of the Image)

The embodiment according to the present invention described above is effective particularly in the case that the input image is a colored image, however, it is also applicable to a gray scale (only luminance component) image and the like.

(Pixel Value within Invalid Block)

In the first embodiment, in order to improve coding efficiency, an arbitrary value can be set for the pixel value of an invalid block (block image constituted of a plurality of don't care pixels). For example, a pixel value of a certain invalid block may be set to "0", and a pixel value of other invalid blocks may be set to "255".

In the second embodiment of the present invention, however, with regard to the pixel value of an invalid block (block image constituted of a plurality of don't care pixels), attention should be paid to the following points.

Specifically, if the transparent color is expressed by allocating the transparent color to the pixel value necessary for expression of an image (for example, pixel value "0"), the pixel value "0" in the valid block image may be handled as the transparent color. Therefore, "0" is preferably set as the pixel value of the invalid block pixel in all layers (the mask layer, the foreground layer, the background layer) of data or image.

If the transparent color can be expressed with a value other than the pixel value necessary for expressing the image, such an arbitrary value as improving coding efficiency may be set for the pixel value in the invalid block image.

In any of the first embodiment and the second embodiment, an arbitrary value may be set for the pixel value in the invalid block pixel as described above, in the following manner. For example, if the JPEG scheme is used for lossy coding, the pixel value "0" is set for all pixels in all invalid block pixels, so that compression efficiency can generally be enhanced without performing complicated processing.

(Mask Generation Principle)

In addition, in the description above, the mask data indicating whether the block image to be processed is valid or invalid as the foreground image is generated based on the line segment block data set in the image region determination processing. The line segment block data is data indicating whether or not the block image to be processed is the line segment block image including a character/line. It is noted that the line segment block image may be an image including not only a character and a line but also an edge portion. Namely, the line segment block data may be data indicating whether or not the block image to be processed is the line segment block image including a character, a line or an edge portion. Here, a known edge extraction method using, for example, Sobel filter, may be used for determination of presence/absence of the edge portion.

(Case in which the Image Scaling-Down Processing is not Performed)

In addition, in the description above, an example of scaling-down the foreground image and the background image has been described. Meanwhile, it is also possible that none of the foreground image and the background image is scaled down or that only one of the foreground image and the background image is scaled down.

In other words, in the image coding processing in FIG. 2 and image coding processing A in FIG. 11, any one or none of step S132 (image scaling-down processing A) and step S152 (image scaling-down processing B) may be performed.

For example, if processing is performed using data corresponding to any of combination numbers "2", "3" and "4" in data table T100 showing relation between the resolution of the image and the block size in FIG. 6, the resolution of the input image is the same as that of the foreground image. Therefore, in the image coding processing and image coding processing A, it is not necessary to perform step S132 (image scaling-down processing A).

In addition, the present invention may be realized without first image scaling-down unit 102 and second image scaling-down unit 103 in image coding apparatus 1000 and image coding apparatus 1000A, in which case the input image, the foreground image and the background image are the same in the resolution. Then, the foreground image and the background image are generated based on image region information in a unit of block image (line segment block data). Coding using an appropriate coding parameter (for example, a quantization parameter and the like in the JPEG scheme) in accordance with the characteristic of the image region is thus possible.

As described above, if any one or none of first image scaling-down unit 102 and second image scaling-down unit 103 is provided in image coding apparatus 1000 and image coding apparatus 1000A, corresponding processing (for example, image scaling-down processing A in step S132) in the image coding processing and image coding processing A may not be performed as appropriate.

(Case of Three or More Layers)

The description above is based on classification of one input image into two layers of the foreground layer and the background layer in a unit of block image, however, the present invention may similarly be realized not only in an example of classification into two layers but also in an example of classification into three or more layers.

For example, in classification into three as well, i.e., a layer expressing a character or a line or an edge (foreground image A), a layer expressing a photograph (foreground image B) and a layer expressing other components (background image), processing in accordance with the principle of the present invention is applicable, so long as a unit for classification is set as a unit of block image.

For example, in the image region determination processing in step S110, the image may be classified in three image regions of an image region including a character, a line or an edge, an image region of a photograph, and another image region, and any of three types of values should only be shown as image region determination data indicating a result of image region determination. For example, "0" may represent a character, a line or an edge, "1" may represent a photograph, and "2" may represent another component.

In addition, in the mask generation processing in step S120, for example for foreground image A, the block image corresponding to "0" may be set as "valid as foreground image A" and the block image corresponding to "1" or "2" may be set as "invalid as foreground image A" based on image region determination data, to generate mask layer data for foreground image A.

On the other hand, for foreground image B, the block image corresponding to "1" may be set as "valid as foreground image B" and the block image corresponding to "0" or "2" may be set as "invalid as foreground image B" based on image region determination data, to generate mask layer data for foreground image B. In the case that N types of image regions are set as well, N−1 pieces of mask layer data should be generated.

In addition, in the foreground image generation processing in step S140 or foreground image generation processing A in step S140A, for example, foreground image A may be generated based on information on validity/invalidity of foreground image A, and foreground image B may be generated based on information on validity/invalidity of foreground image B. In the case that N types of image regions are set as well, N−1 foreground images should be generated.

Moreover, in the background image generation processing in step S160, the block image to be processed, which is "invalid as foreground image A" and "invalid as foreground image B" for example, sets the second scaled-down block image data as the block image valid as the background image. If the block image to be processed satisfies any one of "valid as foreground image A" and "valid as foreground image B", for example, all pixel values of the image as large as the second scaled-down block image should be set to "0" as the block image invalid as the background image.

In the case that N types of image regions are set as well, if the block image to be processed is invalid in all of N−1 foreground images, it is assumed as the block image valid as the background image. Meanwhile, if any one of N−1 foreground images is valid, that block image may be assumed as invalid as the background image.

Another embodiment of classification into three or more layers may be configured such that, in the mask generation processing in step S120, instead of generating mask layer data as many as the foreground images, one piece of mask layer data may indicate any of N types of values, instead of a binary value. Here, in the mask coding processing in step S174, a coding scheme such as FLATE suitable for lossless coding of the multilevel image should be used.

(Layer Structure of Partial Region of Input Image)

In addition, in the description above, an example in which layer data (for example, foreground image, background image, mask layer data) expresses the entire input image (different only in resolution) has been described. The present invention, however, may be configured, for example, such that the background image expresses a region expressing the entire input image (resolution may be low) and the foreground image and the mask layer data express a partial region of the input image.

It is noted that, if the present invention is configured to express the partial region, in the format processing in step S180, information indicating to which partial region on the background image the foreground image and the mask layer data correspond should be associated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image coding apparatus comprising:
a block image region determination unit performing image region determination of an input image in a unit of prescribed block;
a layer data generation unit generating two or more pieces of layer data, of which validity or invalidity in image reproduction is defined in said unit of prescribed block, by using data of said input image, based on a result of image region determination in said block image region determination unit; and
a coding unit subjecting each of said two or more pieces of layer data to coding processing under a coding condition suitable for each of said two or more pieces of layer data generated by said layer data generation unit, in a unit of block suitable for each of said two or more pieces of layer data.

2. The image coding apparatus according to claim 1, wherein
said coding unit includes two or more data coding units subjecting said two or more pieces of layer data to coding processing respectively, under coding conditions suitable for said two or more pieces of layer data respectively, in units of block suitable for said two or more pieces of layer data respectively.

3. The image coding apparatus according to claim 1, wherein
at least one piece of layer data out of said two or more pieces of layer data is image data,
said layer data generation unit sets a plurality of pixel values constituting each block image within one or more block defined as invalid in said image reproduction, in an image based on the layer data which is said image data, and
said plurality of pixel values set by said layer data generation unit are values smaller in coded data capacity obtained as a result of said coding processing of the layer data of said image data by said coding unit, than a value set by using data of said input image.

4. The image coding apparatus according to claim 1, wherein
at least one piece of layer data out of said two or more pieces of layer data is image data,
said image coding apparatus further comprises a resolution conversion unit generating a converted image obtained by converting resolution of said input image, and
said layer data generation unit sets data of one or more block image within said converted image, corresponding to one or more block defined as valid in said image reproduction respectively, in an image based on the layer data which is said image data.

5. The image coding apparatus according to claim 1, further comprising a pixel image region determination unit performing image region determination of said input image in a unit of pixel, wherein
said block image region determination unit performs image region determination in a unit of block based on a result of image region determination in a unit of pixel performed by said pixel image region determination unit.

6. The image coding apparatus according to claim 1, wherein
said block image region determination unit determines whether a block to be determined includes a character or a line,
at least one piece of layer data out of said two or more pieces of layer data generated by said layer data generation unit is image data, and
an image based on the layer data which is said image data is an image in which a character or a line is displayed.

7. The image coding apparatus according to claim 1, wherein
said block image region determination unit determines whether a block to be determined includes at least one of a character, a line and an edge portion,
at least one piece of layer data out of said two or more pieces of layer data generated by said layer data generation unit is image data, and
an image based on the layer data which is said image data is an image in which at least one of a character, a line and an edge portion is displayed.

8. The image coding apparatus according to claim 1, wherein
at least one piece of layer data out of said two or more pieces of layer data is image data, and
at least one piece of layer data out of the layer data other than said image data, out of said two or more pieces of layer data, is mask layer data constituted of a plurality of pieces of mask data each indicating validity or invalidity in said unit of prescribed block in said image reproduction of the layer data which is said image data.

9. The image coding apparatus according to claim 8, further comprising a lossless coding unit subjecting said mask layer data to lossless coding.

10. The image coding apparatus according to claim 9, further comprising a format unit generating associated data obtained by associating a plurality of pieces of data, wherein
said format unit associates said two or more pieces of layer data that have been subjected to said coding processing with said mask layer data that has been subjected to said lossless coding.

11. The image coding apparatus according to claim 1, wherein
at least two pieces of layer data out of said two or more pieces of layer data are image data, and
said layer data generation unit sets a plurality of pixel values constituting each block image within one or more block defined as invalid in said image reproduction, in an image based on the layer data which is said image data, to a transparent color value indicating whether a transparent color is shown.

12. The image coding apparatus according to claim 11, wherein
said layer data generation unit sets a plurality of pixel values constituting each block image within one or more block defined as invalid in said image reproduction, in an image based on at least one piece of layer data for which said transparent color value has not been set out of said at least two pieces of layer data that are said image data, to a value identical to said transparent color value.

13. The image coding apparatus according to claim 11, further comprising a format unit generating associated data obtained by associating a plurality of pieces of data, wherein
said format unit associates said two or more pieces of layer data that have been subjected to said coding processing with each other, and
at least one piece of layer data out of said two or more pieces of layer data includes data set to said transparent color value.

14. The image coding apparatus according to claim 1, wherein
said coding processing is lossy coding processing.

15. The image coding apparatus according to claim 14, wherein
said lossy coding processing is coding processing complying with JPEG scheme.

16. The image coding apparatus according to claim 1, wherein
said prescribed block has equal number of pixels in horizontal direction and in vertical direction, and said number of pixels is set to a value obtained by multiplying 8 by a natural number.

17. The image coding apparatus according to claim 2, wherein
at least one piece of layer data out of said two or more pieces of layer data is image data,
said image coding apparatus further comprises a resolution conversion unit generating a converted image obtained by converting resolution of said input image, and
said layer data generation unit sets data of one or more block image within said converted image, corresponding to one or more block defined as valid in said image reproduction respectively, in an image based on the layer data which is said image data.

18. The image coding apparatus according to claim 2, further comprising a pixel image region determination unit performing image region determination of said input image in a unit of pixel, wherein
said block image region determination unit performs image region determination in a unit of block based on a result of image region determination in a unit of pixel performed by said pixel image region determination unit.

19. The image coding apparatus according to claim 2, wherein
said block image region determination unit determines whether a block to be determined includes a character or a line,
at least one piece of layer data out of said two or more pieces of layer data generated by said layer data generation unit is image data, and
an image based on the layer data which is said image data is an image in which a character or a line is displayed.

20. The image coding apparatus according to claim 2, wherein
said block image region determination unit determines whether a block to be determined includes at least one of a character, a line and an edge portion,
at least one piece of layer data out of said two or more pieces of layer data generated by said layer data generation unit is image data, and
an image based on the layer data which is said image data is an image in which at least one of a character, a line and an edge portion is displayed.

21. The image coding apparatus according to claim 2, wherein
at least one piece of layer data out of said two or more pieces of layer data is image data, and
at least one piece of layer data out of the layer data other than said image data, out of said two or more pieces of layer data, is mask layer data constituted of a plurality of pieces of mask data each indicating validity or invalidity in said unit of prescribed block in said image reproduction of the layer data which is said image data.

22. The image coding apparatus according to claim 2, wherein
at least two pieces of layer data out of said two or more pieces of layer data are image data, and
said layer data generation unit sets a plurality of pixel values constituting each block image within one or more block defined as invalid in said image reproduction, in an image based on the layer data which is said image data, to a transparent color value indicating whether a transparent color is shown.

23. The image coding apparatus according to claim 3, wherein
at least one piece of layer data out of said two or more pieces of layer data is image data,
said image coding apparatus further comprises a resolution conversion unit generating a converted image obtained by converting resolution of said input image, and
said layer data generation unit sets data of one or more block image within said converted image, corresponding to one or more block defined as valid in said image reproduction respectively, in an image based on the layer data which is said image data.

24. The image coding apparatus according to claim 3, further comprising a pixel image region determination unit performing image region determination of said input image in a unit of pixel, wherein said block image region determination unit performs image region determination in a unit of block based on a result of image region determination in a unit of pixel performed by said pixel image region determination unit.

25. The image coding apparatus according to claim 3, wherein
said block image region determination unit determines whether a block to be determined includes a character or a line,
at least one piece of layer data out of said two or more pieces of layer data generated by said layer data generation unit is image data, and
an image based on the layer data which is said image data is an image in which a character or a line is displayed.

26. The image coding apparatus according to claim 3, wherein
said block image region determination unit determines whether a block to be determined includes at least one of a character, a line and an edge portion,
at least one piece of layer data out of said two or more pieces of layer data generated by said layer data generation unit is image data, and
an image based on the layer data which is said image data is an image in which at least one of a character, a line and an edge portion is displayed.

27. The image coding apparatus according to claim 3, wherein
at least one piece of layer data out of said two or more pieces of layer data is image data, and
at least one piece of layer data out of the layer data other than said image data, out of said two or more pieces of layer data, is mask layer data constituted of a plurality of pieces of mask data each indicating validity or invalidity in said unit of prescribed block in said image reproduction of the layer data which is said image data.

28. The image coding apparatus according to claim 3, wherein
at least two pieces of layer data out of said two or more pieces of layer data are image data, and
said layer data generation unit sets a plurality of pixel values constituting each block image within one or more block defined as invalid in said image reproduction, in an image based on the layer data which is said image data, to a transparent color value indicating whether a transparent color is shown.

29. A method of coding an image, executed in an image coding apparatus coding an image, comprising the steps of:
performing, by a processor, image region determination of an input image in a unit of prescribed block;
generating, by a processor, two or more pieces of layer data, of which validity or invalidity in image reproduction is defined in said unit of prescribed block, by using data of said input image, based on a result of image region determination in said step of performing image region determination; and
subjecting, by a processor, each of said two or more pieces of layer data to coding processing under a coding condition suitable for each of said two or more pieces of layer data generated in said step of generating two or more pieces of layer data, in a unit of block suitable for each of said two or more pieces of layer data.

30. The method of coding an image according to claim 29, wherein
said coding processing is lossy coding processing.

31. A computer readable recording medium recording an image coding program executed in a computer, causing a computer to execute the steps of:
performing image region determination of an input image in a unit of prescribed block;
generating two or more pieces of layer data, of which validity or invalidity in image reproduction is defined in said unit of prescribed block, by using data of said input image, based on a result of image region determination in said step of performing image region determination; and
subjecting each of said two or more pieces of layer data to coding processing under a coding condition suitable for each of said two or more pieces of layer data generated in said step of generating two or more pieces of layer data, in a unit of block suitable for each of said two or more pieces of layer data.

32. The recording medium according to claim 31, wherein said coding processing is lossy coding processing.

* * * * *